United States Patent [19]
Ohnishi et al.

[11] Patent Number: 5,693,253
[45] Date of Patent: Dec. 2, 1997

[54] OPTICALLY ANISOTROPIC MATERIAL, PROCESS FOR PRODUCING IT, AND RETARDATION PLATE AND LIQUID CRYSTAL DEVICE USING SAME

[75] Inventors: Toshihiro Ohnishi; Takanobu Noguchi; Masato Kuwabara, all of Tsukuba; Koji Higashi, Takatsuki; Makoto Namioka; Akiko Shimizu, both of Ibaraki, all of Japan

[73] Assignee: Sumitomo Chemical Company, Limited, Osaka, Japan

[21] Appl. No.: 669,969

[22] Filed: Jun. 25, 1996

Related U.S. Application Data

[62] Division of Ser. No. 215,637, Mar. 22, 1994, abandoned.

[30] Foreign Application Priority Data

| Mar. 25, 1993 | [JP] | Japan | 5-066640 |
| Jul. 19, 1993 | [JP] | Japan | 5-178064 |
| Aug. 11, 1993 | [JP] | Japan | 5-199378 |

[51] Int. Cl.$^6$ ............ C09K 19/52; C09K 19/12; C09K 19/00
[52] U.S. Cl. ............ 252/299.01; 252/299.66; 428/1
[58] Field of Search ............ 252/299.01, 299.66; 428/1

[56] References Cited

U.S. PATENT DOCUMENTS

| 554,706 | 9/1896 | Nagase et al. | 526/279 |
| 4,842,380 | 6/1989 | Takayanagi et al. | 359/103 |
| 5,093,739 | 3/1992 | Aida et al. | 359/73 |
| 5,124,824 | 6/1992 | Kozaki et al. | 359/73 |
| 5,142,393 | 8/1992 | Okumura et al. | 359/73 |
| 5,189,538 | 2/1993 | Arakawa | 359/73 |
| 5,194,975 | 3/1993 | Akatsuka et al. | 359/73 |
| 5,245,456 | 9/1993 | Yoshimi et al. | 359/73 |
| 5,250,214 | 10/1993 | Kanemoto et al. | 252/299.01 |
| 5,288,529 | 2/1994 | Harvey et al. | 428/1 |
| 5,332,522 | 7/1994 | Chen et al. | 252/299.01 |
| 5,601,884 | 2/1997 | Ohnishi et al. | 428/1 |

FOREIGN PATENT DOCUMENTS

| 293870 | 12/1988 | European Pat. Off. |
| 397263 | 11/1990 | European Pat. Off. |
| 451905 | 10/1991 | European Pat. Off. |
| 527231 | 2/1993 | European Pat. Off. |
| 2102501 | 8/1990 | Japan |
| 4016916 | 1/1992 | Japan |
| 4-014180 | 8/1992 | Japan |

*Primary Examiner*—C. H. Kelly
*Attorney, Agent, or Firm*—Birch, Stewart, Kolasch & Birch, LLP

[57] ABSTRACT

By using an optically anisotropic film having the optical axis substantially parallel to the normal line of the film and comprising a polymer of a liquid crystal oligomer having positive anisotropy of refractive index and showing nematic or smectic phase, or by lamining the optically anisotropic film and a transparent or semitransparent polymer film, or by combining the optically anisotropic film with a uniaxially oriented retardation film, it is possible to obtain a composite retardation plate with a large viewing angle, and this retardation plate can be applied to a liquid crystal display device.

27 Claims, 3 Drawing Sheets

OPTICALLY ANISOTROPIC MATERIAL, PROCESS FOR PRODUCING IT, AND RETARDATION PLATE AND LIQUID CRYSTAL DEVICE USING SAME

This application is a divisional of application Ser. No. 08/215,637, filed on Mar. 22, 1994, now abandoned the entire contents of which are hereby incorporated by reference.

BACKGROUND OF THE INVENTION

The present invention relates to an optically anisotropic film made of an oriented polymerized liquid crystal oligomer (or this can be said hereinafter "liquid crystal oligomer polymer") or a composition thereof useful as a material of retardation film used for liquid crystal display elements and such, a process for producing such a film, a laminate of an optically anisotropic film and a base, a composite retardation film consisting of said laminate and a uniaxially oriented retardation film, and a liquid crystal display device using them.

The retardation film is a polymeric film having optical homogeneity and durability as well as uniaxial orientation, and commonly used as an optical compensator for improving displaying performance of liquid crystal display elements. Super twisted nematic (STN) type liquid crystal display elements using such retardation films, although having many advantages such as light weight, small thickness and low cost, also had serious disadvantages such as small viewing angle and poor black and white display quality. These disadvantages have been significantly alleviated by introduction of new techniques such as two-layer lamination of the retardation films. However, as regards the viewing angle, no satisfactory improvement has been made, and also no established industrial method is yet available for controlling the viewing angle in certain specific directions.

The viewing angle characteristics of liquid crystal display elements are closely associated not only with angle dependency of birefringence of liquid crystal cell for display but also with angle dependency of retardation of retardation film, and it is known that in use of conventional retardation films, the smaller the angular change of retardation is, the better result is obtained. In view of this, it has been proposed to use homeotropically oriented liquid crystal material as a retardation film having a large refractive index in the direction normal to the film plane.

Japanese Patent Unexamined Publication (JP-A) 2-73327 and JP-A-2-105111 disclose methods using a birefringent layer in which the in-plane refractive index is isotropic but the refractive index in the thickness direction is greater than the in-plane refractive index, for reducing the angular change of background color of the optically uniaxial birefringent body (liquid crystal cell for display) having positive anisotropy of refractive index. A typical example of material having such refractive index anisotropy is a liquid crystal layer oriented homeotropically in a compensation cell.

U.S. Pat. No. 5,189,538 teaches that by using a film having the optical axis in the direction normal to the film plane and a retardation film having a positive birefringence, it is possible to reduce the angular change of retardation and to obtain a retardation film improved in viewing angle characteristics. For making a film having the optical axis in the direction normal to the film plane, a method is shown in which a photopolymerizable compound and a liquid crystal monomer are mixed and polymerization is carried out while maintaining orientation of the liquid crystal monomer in an electric field to fix orientation in the direction normal to the film plane.

JP-A-4-16916 discloses a retardation film using a birefringent layer in which the refractive index in the thickness direction is greater than the in-plane refractive index, said layer being made of a homeotropically oriented polymer liquid crystal material. As means for effectuating homeotropical orientation of the polymer liquid crystal, there are disclosed a method in which the material is heated to the liquid crystal temperature and then an electric or magnetic field is applied in the thickness direction, and a method in which the material is held between two pieces of substrate which have been subjected to surface treatment with a homeotropic alignment agent such as a silane compound, and homeotropically oriented at the liquid crystal temperature. It is disclosed that a retardation film with excellent viewing angle characteristics can be obtained by combining said film with a retardation film obtained by stretching a polymeric material.

Polyvinyl alcohol, which is a polymer having hydroxyl groups in the side chain, is used for producing the homogeneous alignment reagent for liquid crystal molecules in liquid crystal display devices, and it is known that the liquid crystal molecules on the film can be oriented homogeneously by rubbing the surface of the film formed on a transparent electrode substrate.

Digest of Technical Papers of Society for Information Display International Symposium (1993), page 277, reports that it is possible to improve, in principle, the viewing angle characteristics of TN liquid crystal display devices by using two optically anisotropic bodies in which the optical axis is slanted from the normal line of the film and an optically anisotropic body having the optical axis in the film plane.

For attaining orientation of the liquid crystal molecules, a great many attempts have been made and reported, reflecting the fact that orientation of the liquid crystal molecules in the display cell is a key factor for high display quality. In the case of low molecular weight liquid crystal, however, orientation is usually controlled by using an orientation film. For forming an alignment film, there are known, for example, a method in which, for obtaining homogeneous orientation, a polymer (such as polyimide) film is formed on a substrate and the film surface is rubbed with a cloth or other means to orient the liquid crystal molecules; method in which an inorganic material such as $SiO_2$, SiO, MgO or $MgF_2$ is deposited on a substrate by oblique evaporation to form a homogeneous alignment film; and method using a stretched polymer film (Foundation and Application of Liquid Crystal, 1991, pp. 97–100, Kogyo Chosakai). There are also known methods for obtaining oblique orientation of low molecular weight liquid crystal. For example, use of an organic alignment film made of polyimide or oblique evaporation of an inorganic material such as $SiO_2$, SiO, MgO and $MgO_2$ are known. These orientation films serve for uniformalizing orientation of the liquid crystal molecules in the liquid crystal display elements or for giving a pretilt to realize an excellent display image quality.

However, there is yet known no laminated polymer film comprising a liquid crystal oligomer and a hydrophilic substrate in which the optical axis is substantially parallel to the normal line of the film. In production of composite retardation films comprising a laminated film of a liquid crystal polymer and a polymeric substrate and a retardation film, there has been some difficulties to prepare a film having the optical axis in direction normal to the film plane in the conventional production methods; photopolymerization of monomeric liquid crystal should be carried out during applying an external acting field such as an electric or magnetic field, or the liquid crystal layer should be held between two hydrophobic substrates and then separated from, while maintaining orientation of the liquid crystal monomer with large relaxation of orientation for keeping the optical axis normal to the film plane. Thus, in case of using polymer liquid crystal, the method of orientation was complicate, and in case of using low polymer liquid crystal, fixing of orientation was difficult.

Further, as regards the production method of liquid crystal polymers and liquid crystal oligomer films having the optical axis slanted from the normal line of the substrate, there has been known no other technique than to apply a holding electric field to a transparent glass plate having electrodes for effectuating orientation (40th Meeting of Japan Society of Applied Physics, Spring 1993, Lecture No. 29aZK-11).

SUMMARY OF THE INVENTION

As viewed above, in the prior art, there has been available no established industrially advantageous method for production of liquid crystal polymers and films made thereof. The present invention is intended to provide an optically anisotropic film made of a liquid crystal polymer, a polymerized liquid crystal oligomer or a composition thereof with which a composite retardation plate with a wide viewing angle can be made, an industrial production method of such film, a composite retardation plate with a wide viewing angle obtained by laminating said film and a retardation film, and a liquid crystal display device having excellent viewing angle characteristics realized by using said elements.

More specifically, the present invention provides an optically anisotropic film comprising a polymer of a liquid crystal oligomer having positive anisotropy of refractive index and showing a nematic or smectic phase, said liquid crystal oligomer being selected from the linear-chain or cyclic liquid crystal oligomers principally composed of the following recurring units (I) and (II):

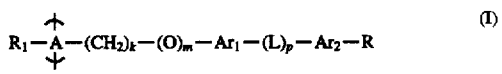

(I)

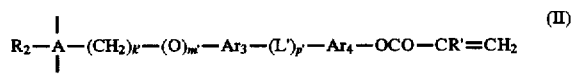

(II)

(wherein A is a group represented by the following formula (III) or (IV):

(III)

(IV)

wherein, in the formula (III), —Si—O— is the main chain of the recurring unit (I) or (II) and, in the formula (IV), —C—CH$_2$— is the main chain of the recurring unit (I) or (II) and COO group is positioned at the side chain which is neither R$_1$ nor R$_2$; when A in the formula (I) or (II) is the formula (III), R$_1$ and R$_2$ are independently hydrogen, C$_{1-6}$ alkyl group or phenyl group, and when A in the formula (I) or (II) is the formula (IV), R$_1$ and R$_2$ are independently hydrogen or C$_{1-6}$ alkyl group; k and k' represent independently an integer of 2 to 10; m and m' are independently 0 or 1; Ar$_1$, Ar$_2$, Ar$_3$ and Ar$_4$ represent independently 1,4-phenylene group, 1,4-cyclohexane group, pyridine-2,5-diyl group or pyrimidine-2,5-diyl group; L and L' represent independently —CH$_2$O—, —O—CH$_2$—, —COO—, —OCO—, —CH$_2$—CH$_2$—, —CH=N—, —N=CH— or a divalent group represented by the formula (V):

(V)

p and p' represent independently a number of 0 or 1; R is halogen, cyano group, C$_{1-10}$ alkyl group or C$_{1-10}$ alkoxy group; and R' is hydrogen or C$_{1-5}$ alkyl group), wherein when the numbers of the recurring units (I) and (II) in one molecule of said oligomer are supposed to be n and n', respectively, n and n' are independently an integer of 1 to 20, and 4≤n+n'≤21, and further characterized in that the end group of the recurring unit (II) is polymerized, and that the optical axis of said film is aligned generally in the direction of an angle selected from between 0° and 80° against the normal line of the film.

There are also provided according to this invention: An optically anisotropic film of the type described above, characterized in that the optical axis of said film is aligned substantially parallel to the normal line of the film plane; and An optically anisotropic film of the type described above, characterized in that the optical axis of said film is slanted 10–80°, in terms of angle of elevation, from the film plane.

The present invention also provides an optically anisotropic film made of a side chain type liquid crystal polymer having positive anisotroply of refractive index and showing a nematic or smectic phase, said liquid crystal polymer being a linear-chain or cyclic liquid crystal polymer principally composed of the following recurring units (IX):

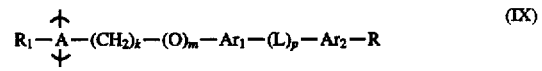

(IX)

(wherein A is a group represented by the following formula (X) or (XI):

(X)

(XI)

wherein, in the formula (X), —Si—O— is the main chain of the formula (IX) and, in the formula (XI), —C—CH$_2$— is the main chain of the formula (IX) and COO group is positioned at the side chain which is not R$_1$; when A in the formula (IX) is the formula (X), R$_1$ is hydrogen, C$_{1-6}$ alkyl group or phenyl group, and when A in the formula (IX) is the formula (XI), R$_1$ is hydrogen or C$_{1-6}$ alkyl group; k is an integer of 2 to 10; m is 0 or 1; p is 0 or 1; Ar$_1$ and Ar$_2$ represent independently 1,4-phenylene group, 1,4-cyclohexane group, pyridine-2,5-diyl group or pyrimidine-2,5-diyl group; L is —CH$_2$—O—, —O—CH$_2$—, —OCO—, —COO—, —CH$_2$—CH$_2$—, —CH=N—, —N=CH— or a divalent group represented by the formula

and R is hydrogen, halogen, cyano group, $C_{1-10}$ alkyl group or $C_{1-10}$ alkoxy group), characterized in that the number of the recurring units is 4 to 10,000, on the average, per one molecule, and that the optical axis of said film is slanted 10–80°, in terms of angle of elevation, from the film plane.

The present invention further provides the processes for producing the above-described optically anisotropic films.

The present invention also provides a laminate comprising an optically anisotropic film made from an optically anisotropic substance such as mentioned above and a hydrophilic substrate such as a transparent or semitransparent substrate.

The present invention further provides a process for producing a composite retardation film, which comprises forming a film of a linear-chain or cyclic liquid crystal polymer composed of said recurring units (IX) and showing a nematic or smectic phase on an optically uniaxial retardation film having the optical axis in the film plane, said film also having positive refractive index anisotropy and made of a thermoplastic polymer, and heat-treating the thus obtained composite film at a temperature above the liquid crystal phase/isotropic phase transition temperature of said liquid crystal polymer.

The present invention also provides a process for producing a composite retardation film, which comprises forming a film of a linear-chain or cyclic liquid crystal polymer composed of said recurring units (IX) and showing a nematic or smectic phase on a substrate having a glass transition temperature higher than the liquid crystal phase/isotropic phase transition temperature of said liquid crystal polymer, heat-treating the thus formed film at a temperature above said liquid crystal/isotropic phase transition temperature, and laminating the substrate having a film of said liquid crystal polymer formed thereon and a uniaxially oriented retardation film having the optical axis in the film plane, said film also having positive anisotropy of refractive index and made of a thermoplastic polymer.

The present invention further provides a laminate of an optically anisotropic film such as mentioned above and a substrate, in which said substrate is a uniaxially oriented retardation film having the optical axis in the film plane, said film also having positive refractive index anisotropy and made of a thermoplastic polymer, and said laminate having a refractive index satisfying the following formula (1):

$$n_x > n_z > n_y \tag{1}$$

(wherein $n_x$ and $n_y$ are the maximum value and the minimum value, respectively, of the in-plane refractive index of the laminate, and $n_z$ is the refractive index in the thickness direction of the laminate), and a composite retardation plate made by using said laminate.

The present invention further provides a composite retardation film having a polarizing film attached thereto, characterized in that a polarizing film and said optically anisotropic film or said laminate of said optically anisotropic film and substrate or said composite retardation plate are bonded to each other with a binder or an adhesive.

The present invention additionally provides a liquid crystal display device comprising a liquid crystal cell comprising a liquid crystal layer held between a pair of substrates provided with electrodes, said liquid crystal layer having positive anisotropy of refractive index and twist orientation torsionally, with the helical axis in the direction normal to the substrate when no electrical voltage is applied, characterized in that at least one of said optically anisotropic film, laminate of said optically anisotropic film and a substrate and composite retardation film is provided between said liquid crystal cell and a polarizing film disposed outside of said cell, or a composite retardation plate having a polarizing film attached thereto is placed on said liquid crystal cell.

DESCRIPTION OF THE PREFERRED EMBODIMENTS

Figure 1:
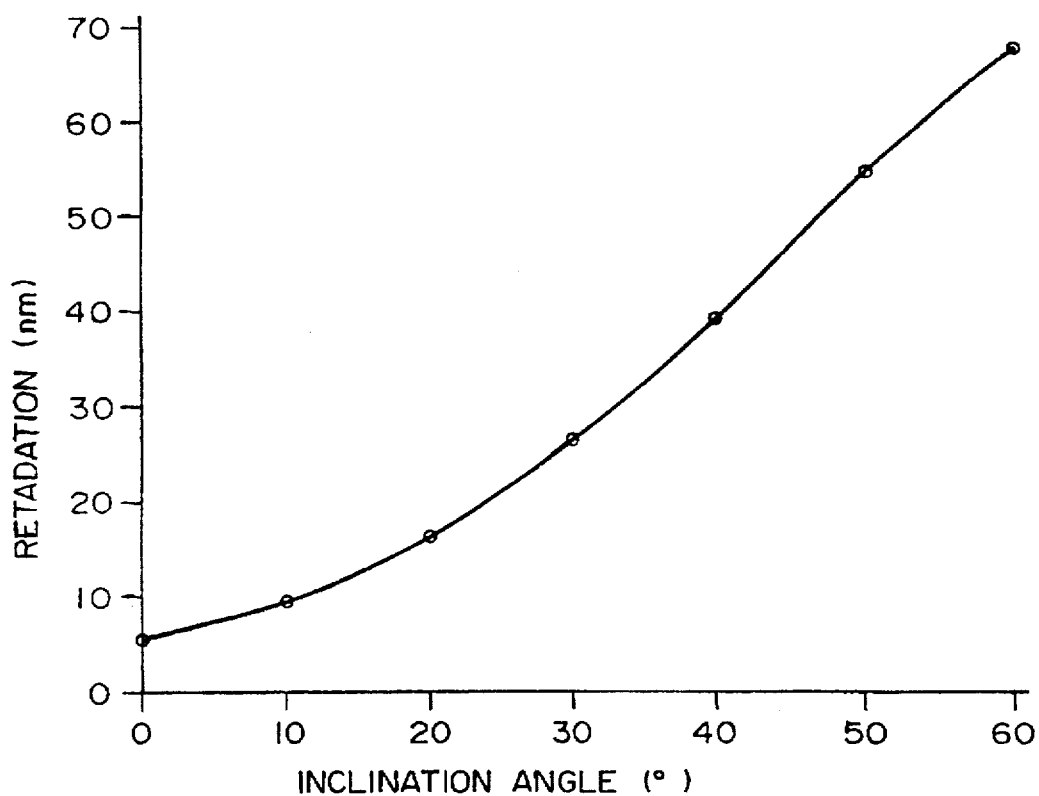
FIG. 1 is a graph showing the relationship between retardation and inclination angle of a laminated film composed of a polymerized liquid crystal oligomer and a polymeric substance obtained in Example 1.

In the course of the studies for overcoming said prior art problems, the present inventors found that by forming a film of a liquid crystal oligomer having positive anisotropy of refractive index and showing a nematic or smectic phase by using said oligomer alone or together with a specific low-molecular weight compound and subjecting the formed film to a treatment for causing homeotropic alignment and then to polymerization, it is possible to attain fixation of film alignment. This technique makes it possible to obtain an optically anisotropic film having the optical axis substantially parallel to the normal line of the substrate plane on a hydrophilic substrate. It was also found that a liquid crystal polymer or a liquid crystal oligomer having positive anisotropy of refractive index and showing nematic or smectic phase can be oriented with an inclination against the normal line of the substrate plane on an oriented substrate. It was further found that by combining an optically anisotropic film such as described above and a uniaxially oriented retardation film, it is possible to obtain a liquid crystal display element having a high black and white display quality and excellent viewing angle characteristics. The present invention was attained on the basis of these novel findings.

Specifically, the present invention embraces the following embodiments (1) to (22) in its claimed scope.

(1) An optically anisotropic film comprising a polymer of a liquid crystal oligomer having positive refractive index anisotropy and showing a nematic or smectic phase, said liquid crystal oligomer being selected from the linear-chain or cyclic liquid crystal oligomers principally composed of the following recurring units (I) and (II):

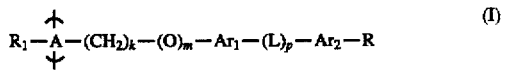

-continued

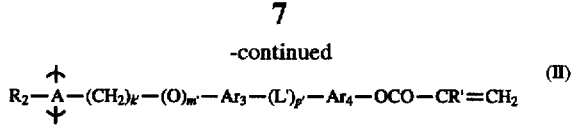  (II)

(wherein A is a group represented by the following formula (III) or (IV):

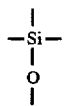  (III)

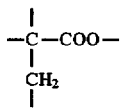  (IV)

wherein, in the formula (III), —Si—O— is the main chain of recurring unit of the formula (I) or (II) and, in the formula (IV), —C—CH$_2$— is the main chain of the recurring unit (I) or (II) and COO group is positioned at the side chain which is neither R$_1$ nor R$_2$; when A in the formula (I) or (II) is the formula (III), R$_1$ and R$_2$ are independently hydrogen, C$_{1-6}$ alkyl group or phenyl group, and when A in the formula (I) or (II) is the formula (IV), R$_1$ and R$_2$ are independently hydrogen or C$_{1-6}$ alkyl group; k and k' represent independently an integer of 2 to 10; m and m' are independently 0 or 1; Ar$_1$, Ar$_2$, Ar$_3$ and Ar$_4$ represent independently 1,4-phenylene group, 1,4-cyclohexane group, pyridine-2,5-diyl group or pyrimidine-2,5-diyl group; L and L' represent independently —CH$_2$—O—, —O—CH$_2$—, —COO—, —OCO—, —CH$_2$—CH$_2$—, —CH=N—, —N=CH— or a divalent group represented by the formula (V):

  (V)

p and p' are independently 0 or 1; R is halogen, cyano group, C$_{1-10}$ alkyl group or C$_{1-10}$ alkoxy group; and R' is hydrogen or C$_{1-10}$ alkyl group), wherein when the numbers of the recurring units (I) and (II) in one molecule of said oligomer are supposed to be n and n', respectively, n and n' are independently an integer of 1 to 20 and 4≦n+n'≦21, and further characterized in that the end group of the recurring unit (II) is polymerized, and that the optical axis of said film is aligned generally to the direction of an angle selected from between 0° and 80° against the normal line of the film.

(2) An optically anisotropic film set forth in (1) above, said film being composed of a polymerized liquid crystal oligomer and a low-molecular weight compound, said low-molecular weight compound being at least one member selected from the group consisting of the compounds of the following formulae (VI), (VII) and (VIII):

R$_3$—Ar$_1$—(L)$_p$—Ar$_2$—R$_4$  (VI)

(wherein Ar$_1$ and Ar$_2$ represent independently 1,4-phenylene group, 1,4-cyclohexane group, pyridine-2,5-diyl group or pyrimidine-2,5-diyl group; R$_4$ is halogen, cyano group, methacryloyl group, acryloyl group, C$_{1-20}$ alkyl group or C$_{1-20}$ alkoxy group; L is —CH$_2$—O—, —O—CH$_2$—, —COO—, —OCO—, —CH$_2$—CH$_2$—, —CH=N—, —N=CH—, 1,4-phenylene group or a divalent group represented by the formula (V); p is 0 or 1; and R$_3$ is C$_{3-30}$ alkyl group or C$_{3-30}$ alkoxy group)

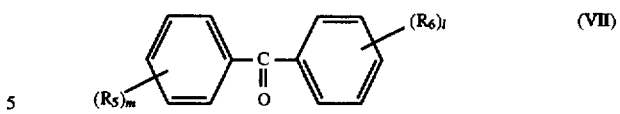  (VII)

(wherein R$_5$ and R$_6$ represent independently hydrogen, C$_{1-}$alkyl group or C$_{1-20}$ alkoxyl group; and m and l are independently 1 or 2)

CH$_2$=C(R$_7$)—COOR$_8$  (VIII)

(wherein R$_7$ is hydrogen or methyl group; and R$_8$ is C$_{1-30}$ hydrocarbon group)

and the composition of said film is 100 parts by weight of said liquid crystal oligomer and 0.1–40 parts by weight of said low-molecular weight compound.

(3) An optically anisotropic film set forth in (1) or (2), characterized in that the optical axis of said film is aligned substantially parallel to the normal line of said film plane.

(4) An optically anisotropic film set forth in (1) or (2), characterized in that the optical axis of said film is inclined 10–80°, in terms of angle of elevation, from the film plane.

(5) An optically anisotropic film made of a side chain type liquid crystal polymer having positive refractive index anisotropy and showing a nematic or smectic phase, said liquid crystal polymer being a linear-chain or cyclic liquid crystal polymer composed of the following recurring units (IX):

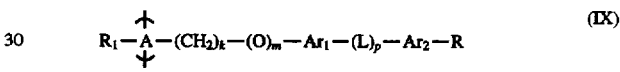  (IX)

(wherein A is a group represented by the following formula (X) or (XI):

  (III)

  (IV)

wherein, in the formula (X), —Si—O— is the main chain of the recurring unit (IX) and, in the formula (XI), —C—CH$_2$— is the main chain of the recurring unit (IX) and COO group is positioned at the side chain which is not R$_1$; when A in the formula (IX) is the formula (X), R$_1$ is hydrogen, C$_{1-6}$ alkyl group or phenyl group, and when A in the formula (IX) is the formula (XI), R$_1$ is hydrogen or C$_{1-6}$ alkyl group; k is an integer of 2 to 10; m is 0 or 1; p is 0 or 1; Ar$_1$ and Ar$_2$ represent independently 1,4-phenylene group, 1,4-cyclohexane group, pyridine- 2,5-diyl group or pyrimidine-2,5-diyl group; L is —CH$_2$—O—, —O—CH$_2$—, —COO—, —OCO—, —CH$_2$—CH$_2$—, CH=N—, —N=CH— or a divalent group represented by the following formula:

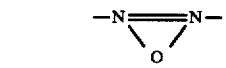

and R is hydrogen, halogen, cyano group, C$_{1-10}$ alkyl group or C$_{1-10}$ alkoxyl group), and the number of the recurring unit (IX) is 4 to 10,000, and further characterized in that the optical axis of said film is aligned generally to the direction of an angle selected from between 10° and 80° against the normal line of the film.

(6) A process for producing an optically anisotropic film set forth in (1), (2) or (3), which comprises forming a film of a linear-chain or cyclic liquid crystal oligomer composed of the recurring units (I) and (II) set forth in (1), subjecting the formed film to a heat treatment so that the optical axis thereof is aligned substantially parallel to the normal line of the film, and then polymerizing the end group of the recurring unit (II).

(7) A process for producing an optically anisotropic film set forth in (1), (2) or (4) which comprises forming a film of a linear-chain or cyclic liquid crystal oligomer composed of the recurring units (I) and (II) described in (1) on substrate subjected to an alignment treatment, subjecting the formed film to a heat treatment so that the optical axis of the film will be aligned 10–80°, in terms of angle of elevation, from the film plane, and then polymerizing the end group of recurring unit (II).

(8) A process for producing an optically anisotropic film set forth in (5), which comprises forming a film of a linear-chain or cyclic liquid crystal polymer composed of the recurring units (IX) described in (5) on a substrate subjected to an alignment treatment, and subjecting the formed film to a heat treatment so that the optical axis of the film will be aligned 10–80°, in terms of angle of elevation, from the film plane.

(9) A process for producing an optically anisotropic film set forth in (7) or (8), wherein the alignment treatment of the substrate is to carry out oblique evaporation of an inorganic material.

(10) A laminate of an optically anisotropic film and a hydrophilic substrate, obtained by laminating an optically anisotropic film set forth in (1), (2) or (3) and a transparent or semitransparent hydrophilic substrate.

(11) A laminate of an optically anisotropic film and a hydrophilic substrate set forth in (10), wherein the substrate is a glass plate, a hydrophilic polymer film or a laminated film consisting of a hydrophilic polymer film and a transparent or semitransparent polymer film.

(12) A process for producing a composite retardation film, which comprises forming a film of a linear-chain or cyclic liquid crystal polymer composed of said recurring units (IX) and showing a nematic or smectic phase on a uniaxially oriented retardation film having the optical axis in the film plane, said film also having positive anisotropy of refractive index and made of a thermoplastic polymer, and heat-treating the formed film at a temperature above the liquid crystal phase/isotropic phase transition temperature.

(13) A process for producing a composite retardation film, which comprises forming a film of a linear-chain or cyclic liquid crystal polymer composed of said recurring units (IX) and showing a nematic or smectic phase on a substrate having a glass transition temperature higher than the liquid crystal phase/isotropic phase transition temperature of said liquid crystal polymer, heat-treating the formed film at a temperature above said liquid crystal phase/isotropic phase transition temperature, and laminating the substrate having formed thereon a film of said liquid crystal polymer and a uniaxially oriented retardation film having the optical axis in the film plane and showing positive anisotropy of refractive index.

(14) A composite retardation film set forth in (13), wherein the substrate is a polarizing film.

(15) A laminate of an optically anisotropic film set forth in (10) and a substrate, said substrate being a uniaxially oriented retardation film having the optical axis in the film plane, said film also having positive fractive index anisotropy and made of a thermoplastic polymer, wherein the fractive index of said laminate is defined by the following formula (1):

$$n_x > n_z > n_y \tag{1}$$

(wherein $n_x$ and $n_y$ are the maximum value and the minimum value, respectively, of the in-plane refractive index of the laminate, and $n_z$ is the refractive index in the thickness direction of the laminate).

(16) A composite retardation plate obtained by laminating a uniaxially oriented retardation film having the optical axis in the film plane, said film also having positive anisotropy of refractive index and made of a thermoplastic polymer, and a laminate of an optically anisotropic film set forth in (10) or (11) and a hydrophilic substrate, wherein the refractive index of said composite retardation plate is defined by the following formula (1):

$$n_x > n_z > n_y \tag{1}$$

(wherein $n_x$ and $n_y$ are the maximum value and the minimum value, respectively, of the in-plane refractive index of the composite retardation plate, and $n_z$ is the refractive index in the thickness direction of said laminated composite retardation plate).

(17) A laminate of an oriented liquid crystal polymer film and a substrate, said film comprising a laminate of an optically anisotropic film set forth in (4) or (5) and a transparent or semitransparent substrate, on which an alignment treatment is carried out.

(18) A laminate of an optically anisotropic film and a substrate set forth in (17), said substrate being a uniaxially oriented retardation film having the optical axis in the film plane, said film also having positive refractive index anisotropy and made of a thermoplastic polymer.

(19) A composite retardation plate obtained by laminating a uniaxially oriented retardation film having the optical axis in the film plane, said film also having positive refractive index anisotropy and made of a thermoplastic polymer, and a laminate of an optically anisotropic film and a substrate set forth in (17).

(20) A polarizing film-incorporated composite retardation film characterized in that a polarizing film and an optically anisotropic film set forth in any of (1) to (5) or a laminate of an optically anisotropic film and a substrate set forth in any of (10) and (15) to (18) are bonded to each other with a binder or an adhesive, or a composite retardation plate set forth in (16) or (19) are bonded to each other with a binder or adhesive.

(21) A liquid crystal display device characterized in that at least one of an optically anisotropic film set forth in any of (1) to (5), a laminate of an optically anisotropic film and a substrate set forth in any of (10) and (15), (17) and (18) and a composite retardation plate set forth in (16) or (19) is provided between a liquid crystal cell and a polarizing film disposed outside thereof, said liquid crystal cell comprising a liquid crystal layer held by the substrates having the electrodes, said layer having positive dielectric anisotropy and twistedly oriented 90° to 270° with the helical axis aligned vertically to the substrate when no voltage is applied, or a polarizing film-incorporated composite retardation film set forth in (20) is disposed on said liquid crystal cell.

(22) A liquid crystal display device in which at least one of an optically anisotropic film set forth in any of (1) to (5)

and a laminate set forth in any of (10), (15), (17) and (18) is provided between a liquid crystal cell and a polarizing film disposed outside thereof, said liquid crystal cell comprising a homogeneously oriented nematic liquid crystal having positive dielectric anisotropy and held by the substrates provided with the electrodes, said nematic liquid crystal having its major molecular axis aligned substantially horizontally to the substrate when no voltage is applied.

(23) A laminate comprising a polymer substrate and an aligned polymerized liquid crystal oligomer film set forth in above (1), said polymer substrate being obtained by subjecting a surface of transparent or semi-transparent polymer substrate to hard coat treatment.

(24) A laminate set forth in above (23), wherein the substrate is a uniaxially oriented retardation film having an optical axis in a film plane, having positive anisotropy of refractive index, and made of a thermoplastic polymer, and said laminate having a refractive index satisfying the following formula (1):

$$n_x > n_z > n_y \qquad (1)$$

wherein $n_x$ and $n_y$ are the maximum value and the minimum value, respectively, of the in-plane refractive index of the laminate; and $n_z$ is the refractive index in the thickness direction of the laminate.

(25) A composite retardation plate comprising a uniaxially oriented retardation film having an optical axis in a film plane, having positive anisotropy of refractive index and made of a thermoplastic polymer, and a laminate set forth in above (23) comprising an aligned polymerized liquid crystal oligomer film and a substrate, and said composite retardation plate having a refractive index satisfying the following formula (1):

$$n_x > n_z > n_y \qquad (1)$$

wherein $n_x$ and $n_y$ are the maximum value and the minimum value, respectively, of the in-plane refractive index of the composite retardation plate; and $n_z$ is the refractive index in the thickness direction of the composite retardation plate.

(26) A liquid crystal display device comprising a liquid crystal cell comprising a liquid crystal layer held between a pair of substrates provided with electrodes, said liquid crystal layer having positive anisotropy of refractive index and twist orientation torsionally with a helical axis in the direction normal to the substrates when no electrical voltage is applied, a pair of polarizing films being provided outside the electrode substrates, and at least one member selected from the group consisting of (a) a laminate comprising an aligned polymerized liquid crystal oligomer film and a substrate set forth in above (23) or (24), and (b) a composite retardation plate set forth in above (25) being placed between the electrode substrates and the polarizing films, respectively.

(27) A liquid crystal display device set forth in above (26), wherein at least one member selected from the group consisting of (a) a laminate comprising an aligned polymerized liquid crystal oligomer film and a substrate set forth in above (24) and (b) a composite retardation plate set forth in above (25) is used, and the aligned polymerized liquid crystal oligomer film being placed between (A) a uniaxially oriented retardation film constituting the laminate or the composite retardation plate and having positive anisotropy of refractive index, and (B) a polarizing film.

(28) A liquid crystal display device comprising
 a pair of transparent substrates having electrodes thereon and sandwitching a liquid crystal cell containing a nematic liquid crystal layer having positive dielectric anisotropy and oriented substantially horizontally with a helical axis torsionally aligned vertically to the substrate when no voltage is applied,
 a pair of polarizing films positioned outside a pair of the transparent electrodes, and
 at least one uniaxially aligned retardation film having positive anisotropy of refractive index and made from a thermoplastic polymer positioned between the liquid crystal cell and at least one of the polarizing films, and
 at least one layer of optically anisotropic film set forth in above (1), (2) or (5) being present between the liquid crystal cell and at least one of the polarizing films.

(29) A liquid crystal display device comprising
 a pair of transparent substrates having electrodes thereon and sandwitching a liquid crystal cell containing a nematic liquid crystal layer having positive dielectric anisotropy and homogeneously oriented in the almost horizontal direction when no voltage is applied, and
 a pair of polarizing films positioned outside a pair of the transparent electrodes, and
 at least one layer of the optically anisotropic film set forth in above (1), (2) or (5) being present between at least one of the polarizing films and the liquid crystal cell.

The present invention is further illustrated below.

The liquid crystal oligomer composed of the recurring units (I) and (II) and the liquid crystal polymer composed of the recurring units (IX) used in the present invention are a side chain type liquid crystal oligomer and a side chain type liquid crystal polymer which have positive anisotropy of refractive index and assume a nematic or smectic phase in the state of liquid crystal. The backbone of the side chain type liquid crystal oligomer or polymer is constituted by, for example, a poly-1-alkylacrylic acid ester or a polysiloxane. Such an oligomer or polymer may be of a linear-chain or cyclic structure. In the case of liquid crystal oligomer, however, the cyclic structure is preferred because of better chemical stability. Preferred examples of poly-1-alkylacrylic acid esters usable for said purpose are polymethacrylic acid esters and polyacrylic acid esters, the former being more preferable. Among these side chain type liquid crystal oligomers or polymers, those of the polysiloxane basis are preferred. There is generally used one in which the group closely related to liquid crystalline property (which group may hereinafter be referred to as mesogen group) is bonded to the backbone through a folded chain (which may hereinafter be referred to as spacer).

The length of the spacer, type of mesogen group and polymerization degree of the side chain type liquid crystal oligomer or polymer used in this invention are preferably so selected that the transition temperature from liquid crystal phase to isometric phase (which may hereinafter be referred to as liquid crystal phase/isometric phase transition temperature) will become 200° C. or below, preferably 170° C. or below, more preferably 150° C. or below, for facilitating drying at the time of lamination on the substrate or orientation treatment.

The side chain type liquid crystal oligomer used in the present invention needs to be oriented so as to give positive anisotropy of refractive index to the film, and the number of recurring units is an important factor for facilitating this operation. Too large a number of recurring units leads to a high viscosity and a high liquid crystal transition temperature, which necessitates a high temperature and a long time for orientation, while too small a number of recurring units may cause relaxation of the orientation under around room temperature. The numbers n and n' of the recurring units (I) and (II) are each an integer of 1 to 20, and they are selected so that n+n'=4 to 21. In view of orientation characteristics and fixation of orientation after polymerization, the n:n' ratio is preferably in the range from 1:5 to 5:1, more preferably 1:3 to 3:1. The n/n' ratio may be properly adjusted when synthesizing the liquid crystal oligomer as described later.

In the case of the side chain type liquid crystal polymer composed of the recurring units (IX), the polymerization degree should be 4 to 10,000, preferably 4 to 1,000, more preferably 4 to 21.

The liquid crystal transition temperature and orientation characteristics of the side chain type liquid crystal oligomer or polymer are also affected by the spacer connecting the mesogen group to the backbone. Too short a spacer deteriorates the orientation characteristics of mesogen group, while too long a spacer tends to cause relaxation of orientation. Therefore, as spacer, alkylene group or alkyleneoxy group with a carbon number of 2 to 10 is preferred. $C_{2-6}$ alkylene or alkyleneoxy group is especially preferred because of easier orientation. For facilitation of synthesis, alkyleneoxy group is more preferred. Typical examples of the preferred groups are: —(CH$_2$)$_2$—, —(CH$_2$)$_3$—, —(CH$_2$)$_4$—, —(CH$_2$)$_5$—, —(CH$_2$)$_6$—, —(CH$_2$)$_3$—O—, —(CH$_2$)$_4$—O—, —(CH$_2$)$_5$—O— and —(CH$_2$)$_6$—O—.

It is desirable that oriented liquid crystal oligomer film of this invention has positive anisotropy of refractive index, and for this reason, mesogen group used in this invention is preferably one which has positive anisotropy of refractive index. The structures which can provide such mesogen group include those of the oligomers composed of the recurring units (I) and (II) wherein Ar$_1$, Ar$_2$, Ar$_3$ and Ar$_4$ represent independently 1,4-phenylene group, 1,4-cyclohexane group, pyridine-2,5-diyl group or pyrimidine-2,5-diyl group. They also include the structure in which the divalent group L connecting Ar$_1$ and Ar$_2$ or Ar$_3$ and Ar$_4$ is —CH$_2$—O—, —O—CH$_2$—, —COO—, —OCO—, —CH$_2$—CH$_2$—, —CH=N—, —N=CH— or

and the structure in which Ar$_1$ and Ar$_2$ or Ar$_3$ and Ar$_4$ are directly bonded. More preferably, Ar$_1$, Ar$_2$, Ar$_3$ and Ar$_4$ are independently 1,4-phenylene group, pyridine-2,5-diyl group or pyrimidine-2,5-diyl group, most preferably 1,4-phenylene group. Preferably the connecting groups L and L' are independently —CH$_2$—CH$_2$—, —COO— or —OCO—, more preferably —COO— group.

The group R in the recurring units (I) and (IX) influences dielectric anisotropy or orientation performance of mesogen group, so that R is selected from halogen, cyano group, $C_{1-10}$ alkyl group and $C_{1-10}$ alkoxy group, preferably cyano group, $C_{1-10}$ alkyl group and $C_{1-10}$ alkoxy group, more preferably cyano group, for obtaining a liquid crystal oligomer or liquid crystal polymer film with strong anisotropy of refractive index.

The terminal group of the recurring unit (II) is a group for fixing orientation of the liquid crystal oligomer by polymerization. Polymerizable groups usable in this invention are those of the formula —OCO—CR'=CH$_2$ (R' is hydrogen or $C_{1-5}$ alkyl group), which include acrylate groups and methacrylate groups. The polymerization method of these groups is not specified, but usually photopolymerization or thermal polymerization using a radical polymerization initiator is employed. Photopolymerization is preferred for easiness of operation and high orientation fixing efficiency. Known photopolymerization initiators can be used.

Examples of the nonpolymerizable mesogen groups usable for the linear-chain or cyclic liquid crystal oligomers composed of the recurring units (I) or the linear-chain or cyclic liquid crystal polymers composed of the recurring units (I) are shown in Tables 1–4.

TABLE 1

| Ar$_1$—(L)$_p$—Ar$_2$ | R | Spacer | | | | | |
|---|---|---|---|---|---|---|---|
| | | —(CH$_2$)$_3$— | —(CH$_2$)$_4$— | —(CH$_2$)$_5$— | —(CH$_2$)$_3$—O— | —(CH$_2$)$_4$—O— | —(CH$_2$)$_5$O— |
| ⟨◯⟩—⟨◯⟩ | —CN | 1 | 2 | 3 | 4 | 5 | 6 |
| " | —OCH$_3$ | 7 | 8 | 9 | 10 | 11 | 12 |
| " | —OC$_2$H$_5$ | 13 | 14 | 15 | 16 | 17 | 18 |
| " | —C$_6$H$_{13}$ | 19 | 20 | 21 | 22 | 23 | 24 |
| " | —F | 25 | 26 | 27 | 28 | 29 | 30 |
| ⟨◯⟩—COO—⟨◯⟩ | —CN | 31 | 32 | 33 | 34 | 35 | 36 |
| " | —OCH$_3$ | 37 | 38 | 39 | 40 | 41 | 42 |
| " | —OC$_2$H$_5$ | 43 | 44 | 45 | 46 | 47 | 48 |
| " | —C$_6$H$_{13}$ | 49 | 50 | 51 | 52 | 53 | 54 |
| " | —F | 55 | 56 | 57 | 58 | 59 | 60 |

TABLE 2
| $Ar_1-(L)_p-Ar_2$ | R | \multicolumn{6}{c}{Spacer} |
| | | $-(CH_2)_3-$ | $-(CH_2)_4-$ | $-(CH_2)_5-$ | $-(CH_2)_3-O-$ | $-(CH_2)_4-O-$ | $-(CH_2)_5O-$ |
|---|---|---|---|---|---|---|---|
| 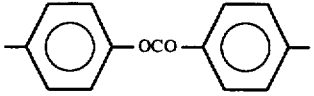 | $-CN$ | 61 | 62 | 63 | 64 | 65 | 66 |
| " | $-OCH_3$ | 67 | 68 | 69 | 70 | 71 | 72 |
| " | $-OC_2H_5$ | 73 | 74 | 75 | 76 | 77 | 78 |
| " | $-C_6H_{13}$ | 79 | 80 | 81 | 82 | 83 | 84 |
| " | $-F$ | 85 | 86 | 87 | 88 | 89 | 90 |
| 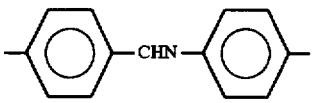 | $-CN$ | 91 | 92 | 93 | 94 | 95 | 96 |
| " | $-OCH_3$ | 97 | 98 | 99 | 100 | 101 | 102 |
| " | $-OC_2H_5$ | 103 | 104 | 105 | 106 | 107 | 108 |
| " | $-C_6H_{13}$ | 109 | 110 | 111 | 112 | 113 | 114 |
| " | $-F$ | 115 | 116 | 117 | 118 | 119 | 120 |
TABLE 3
| $Ar_1-(L)_p-Ar_2$ | R | $-(CH_2)_3-$ | $-(CH_2)_4-$ | $-(CH_2)_5-$ | $-(CH_2)_3-O-$ | $-(CH_2)_4-O-$ | $-(CH_2)_5O-$ |
|---|---|---|---|---|---|---|---|
| 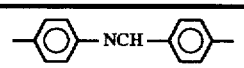 | $-CN$ | 121 | 122 | 123 | 124 | 125 | 126 |
| " | $-OCH_3$ | 127 | 128 | 129 | 130 | 131 | 132 |
| " | $-OC_2H_5$ | 133 | 134 | 135 | 136 | 137 | 138 |
| " | $-C_6H_{13}$ | 139 | 140 | 141 | 142 | 143 | 144 |
| " | $-F$ | 145 | 146 | 147 | 148 | 149 | 150 |
| 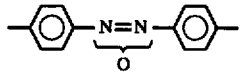 | $-CN$ | 151 | 152 | 153 | 154 | 155 | 156 |
| " | $-OCH_3$ | 157 | 158 | 159 | 160 | 161 | 162 |
| " | $-OC_2H_5$ | 163 | 164 | 165 | 166 | 167 | 168 |
| " | $-C_6H_{13}$ | 169 | 170 | 171 | 172 | 173 | 174 |
| " | $-F$ | 175 | 176 | 177 | 178 | 179 | 180 |
TABLE 4
| $Ar_1-(L)_p-Ar_2$ | R | $(CH_2)_3$ | $(CH_2)_4$ | $(CH_2)_5$ | $(CH_2)_3-O-$ | $(CH_2)_4-O-$ | $(CH_2)_5O-$ |
|---|---|---|---|---|---|---|---|
| 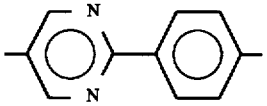 | $-CN$ | 181 | 182 | 183 | 184 | 185 | 186 |
| " | $-OCH_3$ | 187 | 188 | 189 | 190 | 191 | 192 |
| " | $-OC_2H_5$ | 193 | 194 | 195 | 196 | 197 | 198 |
| " | $-C_6H_{13}$ | 199 | 200 | 201 | 202 | 203 | 204 |
| " | $-F$ | 205 | 206 | 207 | 208 | 209 | 210 |

TABLE 4-continued

| $Ar_1-(L)_p-Ar_2$ | R | Spacer | | | | | |
|---|---|---|---|---|---|---|---|
| | | $-(CH_2)_3-$ | $-(CH_2)_4-$ | $-(CH_2)_5-$ | $-(CH_2)_3-O-$ | $-(CH_2)_4-O-$ | $-(CH_2)_5-O-$ |
| 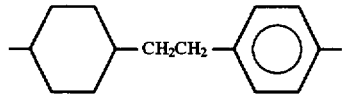 | —CN | 211 | 212 | 213 | 214 | 215 | 216 |
| " | —OCH₃ | 217 | 218 | 219 | 220 | 221 | 222 |
| " | —OC₂H₅ | 223 | 224 | 225 | 226 | 227 | 228 |
| " | —C₆H₁₃ | 229 | 230 | 231 | 232 | 233 | 234 |
| " | —F | 235 | 236 | 237 | 238 | 239 | 240 |

Among these mesogen groups, those of Nos. 1–18, 31–48, 61–78, 181–198 and 211–228 having cyano group or alkoxyl group are preferred. Those of Nos. 31–42 are especially preferred. Of these mesogen groups, those bonded to the polysiloxane-based backbone are preferred for high orientation performance. Those bonded to the cyclic siloxane backbone are most preferred.

Examples of the polymerizable mesogen groups usable for the linear-chain or cyclic liquid crystal oligomers composed of the recurring units (II) are shown in Tables 5–7.

TABLE 5

| $Ar_3-(L')_{p'}-Ar_4$ | R' | Spacer | | | | | |
|---|---|---|---|---|---|---|---|
| | | $-(CH_2)_3-$ | $-(CH_2)_4-$ | $-(CH_2)_5-$ | $-(CH_2)_3-O-$ | $-(CH_2)_4-O-$ | $-(CH_2)_5-O-$ |
| 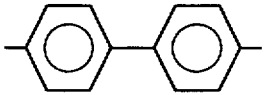 | H | 241 | 242 | 243 | 244 | 245 | 246 |
| " | CH₃ | 247 | 248 | 249 | 250 | 251 | 252 |
| 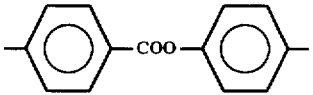 | H | 253 | 254 | 255 | 256 | 257 | 258 |
| " | CH₃ | 259 | 260 | 261 | 262 | 263 | 264 |

TABLE 6

| $Ar_3-(L')_{p'}-Ar_4$ | R' | Spacer | | | | | |
|---|---|---|---|---|---|---|---|
| | | $-(CH_2)_3-$ | $-(CH_2)_4-$ | $-(CH_2)_5-$ | $-(CH_2)_3-O-$ | $-(CH_2)_4-O-$ | $-(CH_2)_5-O-$ |
| 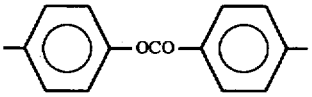 | H | 265 | 266 | 267 | 268 | 269 | 270 |
| " | CH₃ | 271 | 272 | 273 | 274 | 275 | 276 |
| 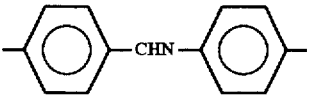 | H | 277 | 278 | 279 | 280 | 281 | 282 |
| " | CH₃ | 283 | 285 | 285 | 286 | 287 | 288 |
| 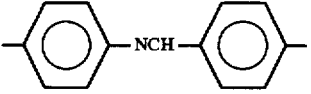 | H | 289 | 290 | 291 | 292 | 293 | 294 |
| " | CH₃ | 295 | 296 | 297 | 298 | 299 | 300 |

TABLE 7

| Ar₃—(L')ₚ—Ar₄ | R' | —(CH₂)₃— | —(CH₂)₄— | —(CH₂)₅— | —(CH₂)₃—O— | —(CH₂)₄—O— | —(CH₂)₅—O— |
|---|---|---|---|---|---|---|---|
| ⟨○⟩—N=N(→O)—⟨○⟩ | H | 301 | 302 | 303 | 304 | 305 | 306 |
| " | CH₃ | 307 | 308 | 309 | 310 | 311 | 312 |
| ⟨N○N⟩—⟨○⟩ | H | 313 | 314 | 315 | 316 | 317 | 318 |
| " | CH₃ | 319 | 320 | 321 | 322 | 323 | 324 |
| ⟨○⟩—CH₂CH₂—⟨○⟩ | H | 325 | 326 | 327 | 328 | 329 | 330 |
| " | CH₃ | 331 | 332 | 333 | 334 | 335 | 336 |

Among these polymerizable mesogen groups, those of Nos. 247–252, 259–264, 271–276, 319–324 and 331–336 having methacrylate group are preferred, and those of Nos. 259–264 are especially preferred. Of these mesogen groups, those bonded to the linear-chain or cyclic polysiloxane-based backbond are preferred as they give good properties to the subject oligomers or polymers, and those bonded to the cyclic polysiloxane backbone are especially preferred.

For the synthesis of these liquid crystal polymers or liquid crystal oligomers, the methods disclosed in JP-B-63-47759 and JP-A-4-16916 can be employed. More specifically, there can be used a method in which said side chain mesogen group is added to the polysiloxane backbone, or a method in which an acrylic acid ester or methacrylic acid ester having a mesogen group through a flexible spacer is polymerized. In case of adding mesogen group to the polysiloxane backbone, the reacting material having the same structure as the side chain mesogen group of the recurring units (I), (II) and (IX) and having ω-alkenyloxy group producing an alkyleneoxy group (spacer) and having unsaturated double bond at the terminal is reacted with polysiloxane in the presence of a platinum catalyst.

In the case of a liquid crystal oligomer composed of the recurring units (I) and (II), it is possible to control the bonding ratio of the two types of mesogen groups, i.e. nonpolymerizable mesogen groups and polymerizable mesogen groups, by adjusting the feed rate of the reacting material relative to said mesogen groups in the reaction. Similarly, for those oligomers in which the backbone is an acrylic acid ester or an α-alkyl-acrylic acid ester, the ratio of the polymerizable mesogen groups to the nonpolymerizable mesogen groups can be controlled by adjusting the monomer feed rate when two types of monomers having the corresponding mesogen groups are copolymerized.

The liquid crystal oligomer obtained in the manner described above is preferably one which shows the nematic or smectic phase. The one which shows the smectic phase is preferred because of higher optical anisotropy.

The crystal phase or glass phase/liquid crystal phase transition temperature of these liquid crystal oligomers is not specified in this invention; it may be below room temperature.

For making a film of a liquid crystal oligomer, liquid crystal oligomer composition or liquid crystal polymer which is oriented in a specific direction against the normal line of the film, a method is generally employed in which a film is formed on a substrate subjected to an alignment treatment and then the liquid crystal oligomer, oligomer composition or polymer is oriented by a heat treatment. The conditions of the orientation treatment of the substrate and the heat treatment for orientation varies depending on the direction of orientation, so that they are properly selected case by case.

The method for making a film of a liquid crystal oligomer, liquid crystal oligomer composition or liquid crystal polymer is also not specified in this invention. For instance, a method may be mentioned in which a liquid crystal oligomer, liquid crystal oligomer composition or liquid crystal polymer is coated on a substrate in a state of solution or in a state of isotropic phase. Coating in a state of solution is preferred. Coating may be accomplished by ordinary methods such as roll coating, gravure coating, bar coating, spin coating, spray coating, printing, dip coating, etc. The obtained liquid crystal oligomer or polymer film may be used in the form as it is, but it is preferably laminated on a substrate for commercial use.

The thickness of said liquid crystal oligomer or polymer film is preferably 0.1 to 20 μm, more preferably 0.5 to 15 μm, even more preferably 1 to 12 μm. When the film thickness is less than 0.1 μm, the film material may fail to develop its normal optical properties, and when the film thickness exceeds 20 μm, the film is hard to orient.

For making a film of a liquid crystal oligomer or liquid crystal oligomer composition having the optical axis substantially parallel to the normal line of the film according to this invention, a film of said oligomer or oligomer composition is formed on a hydrophilic substrate and then the film is oriented. Orientation can be accomplished by heat-treating said film of liquid crystal oligomer or oligomer composition at a temperature above the transition temperature from the crystal phase or glass phase to the liquid crystal phase (this transition temperature may hereinafter be referred to as Tg) and below the transition temperature from the liquid phase to the isotropic phase (this transition temperature may hereinafter be referred to as Ti). As for the heat treatment temperature (which may hereinafter be referred to as Tt), preferably Tg+30° C.≦Tt<Ti, and the heat treatment is preferably carried out at a temperature defined by Tg+40° C.≦Tt<Ti. The time of heat treatment is not critical in this invention, but too short a heating time results in unsatisfactory homeotropic orientation, while too long a heating time is undesirable for economical reason, so that the heat treatment time is preferably 0.2 minutes to 20 hours, more preferably one minute to one hour. As a result of said heat treatment, the mesogen groups in the liquid crystal oligomer are oriented substantially homeotropic to the film plane, and consequently the film has the optical axis in the direction normal to the film plane.

In the case of polymerized liquid crystal oligomer film, the film is oriented so that it will have the optical axis substantially parallel to the normal line of the film plane or in a specific direction and then the liquid crystal oligomer is polymerized. Polymerization method is not defined, but since the oligomer must be polymerized while maintaining orientation, photopolymerization, radiation polymerization using γ-rays, etc., or thermal polymerization is preferably employed. A known polymerization initiator can be used in photopolymerization or thermal polymerization. Of these polymerization methods, photopolymerization and thermal polymerization are preferred for simplicity of the process. Photopolymerization is most preferred for high stability of orientation.

In case the thermal treatment temperature is below the liquid crystal phase/isotropic phase transition temperature, a substrate having a hydrophilic surface can be favorably used for providing orientation substantially parallel to the normal line of the film. As such substrate, there can be used a glass plate as a single body or a glass plate bonded to a liquid crystal cell. It is also possible to utilize a hydrophilic polymer containing hydroxy groups, carboxylate ions or sulfonate ions. A polymer substrate having a hydrophilic polymer layer at the surface can be also used.

Of the hydrophilic polymers, those having hydroxyl groups include polyvinyl alcohol, polyethylene-vinyl alcohol copolymer, and natural polysaccharides such as pullulan and dextrin obtained from microbial fermentation of malt syrup. Of these polymers, poly vinyl alcohol is preferred in view of solubility and easiness of homeotropic orientation.

Examples of the polymers containing carboxylate ions include polyacrylic acid, sodium polyacrylate, polymethacrylic acid, sodium polyalginate, sodium salt of polycarboxymethyl cellulose and others. Of these polymers, sodium polyalginate, sodium salt of polycarboxymethyl cellulose and polyacrylic acid are preferred.

A typical example of the polymers containing sulfonate ions is polystyrenesulfonic acid. Of these hydrophilic polymers, polyvinyl alcohol, sodium polyalginate, sodium salt of polycarboxymethyl celluose, polyacrylic acid, pullulan and polystyrene sulfonic acid are preferred. Polyvinyl alcohol and sodium polyalginate are especially preferred.

For orienting the nonpolymerizable side chain type liquid crystal oligomer or side chain type liquid crystal polymer in the direction substantially parallel to the normal line of the film, either a hydrophilic or a hydrophobic substrate can be used, and in this case, heat treatment is carried out at a temperature above the liquid crystal phase/isotropic phase transition temperature of the liquid crystal oligomer or liquid crystal polymer. The hydrophilic substrate used here is preferably one in which the contact angle with water is 60° or less, preferably 50° or less. In the case of hydrophobic substrate, the contact angle with water is 85° or greater, preferably 90° or greater. Use of a hydrophilic substrate is preferred because of easy homeotropic alignment. The hydrophilic polymers usable here include the above-mentioned polymers having hydroxyl groups, carboxylate ions or sulfonate ions. The hydrophobic polymers usable for making said substrate include fluorine polymers such as polytetrafluoroethylene and polyvinylidene fluoride, polymers such as polycarbonate, polysulfone, polyarylate, polyethersulfone, cellulose triacetate, cellulose diacetate and polyethylene terephthalate, and hydrophilic polymers such as polyvinyl alcohol and saponified ethylene-vinyl acetate copolymer, which polymers have been subjected to a treatment for making them hydrophobic. The treatments useful for making said polymers hydrophobic include coating with a fluorine polymer or a surfactant such as lecithin, and reaction of said polymers with a silane coupling agent or titanium coupling agent.

The temperature of thermal treatment of the liquid crystal oligomer film or liquid crystal polymer layer formed on a substrate is preferably above the liquid crystal phase/isotropic phase transition temperature of the liquid crystal oligomer or liquid crystal polymer used and below the glass transition temperature of the substrate. When the thermal treatment temperature is higher than the glass transition temperature of the substrate used, there arise the problems in the production process, such as deformation of the substrate. The optimal temperature range for the heat treatment can be properly selected by taking into consideration transition temperature of the polymer liquid crystal used and glass transition temperature of the substrate used.

The alignment treatment of the substrate used for orienting the mesogen groups in such a direction as to let the film have the optical axis inclined 10–80°, in terms of angle of elevation, from the film plane in the present invention varies depending on the phase structure of the liquid crystal used.

For instance, in case of using a liquid crystal material showing the nematic or smectic A phase, there can be employed a method using an oblique evaporation film of an inorganic material on the substrate, or a method in which after formation of an oblique evaporation film of an inorganic material, a surface treatment is carried out with a surfactant such as lecithin or a known homeotropic alignment agent such as silane coupling agent or titanium coupling agent. In carrying out oblique evaporation of an inorganic material, said inorganic material is preferably applied at a small angle against the substrate so that the oblique evaporation will be performed uniformly. Specifically, the inorganic material is preferably applied at an angle of 45° less, more preferably 30° or less, in terms of angle of elevation from the substrate surface.

The direction of inclination of the optical axis of the liquid crystal polymer or liquid crystal oligomer film obtained by using said oblique evaporation film relates to the direction of evaporation, so that it is possible to set the optical axis in a desired direction in the film plane by fixing the direction of evaporation. However, the tilt angle of the optical axis and the evaporation angle do not usually agree with each other and vary depending on the alignment agent and liquid crystal material used.

The inorganic material used for evaporation in the present invention is preferably one which makes prismatic growth during evaporation. Preferred examples of such inorganic material are SiO, $SiO_2$, $SiO_x$, $MgF_2$, Pt, ZnO, $MoO_3$, $WO_3$, $Ta_2O_5$, $SnO_2$, $CeO_2$, $LiNbO_3$, $LiTaO_3$, $ZrO_2$, $Bi_2O_3$, $TiZrO_4$ and $MgO_x$ (1<x<2). Of these compounds, SiO, $SiO_2$, $SiO_x$, MgO, $MgO_x$, $MgF_2$, Pt and ZnO are preferred. SiO, $SiO_2$ and $SiO_x$ are especially preferred.

The method for oblique evaporation is not specified in this invention. Such evaporation may be accomplished by making use of resistance heating or electron-beam heating or by sputtering. Evaporation by electron-beam heating or sputtering is preferred for depositing a high-melting point inorganic material. The degree of vacuum for evaporation is not critical. The upper limit of pressure that can be applied is decided from the viewpoint of uniformity of the deposited film, and the lower limit of pressure is decided from the viewpoint of productivity. Specifically, said evaporation is usually carried out under a vacuum of $1\times10^{-3}$ to $1\times10^{-7}$ Terr, preferably $5\times10^{-4}$ to $5\times10^{-6}$ Terr.

The deposition rate of inorganic material is also not critical in this invention, but it is to be noted that a low deposition rate leads to poor productivity while a high deposition rate may deteriorate uniformity of the deposited film. In view of this, the deposition rate is preferably set at 0.01 to 10 nm/sec, more preferably 0.1 to 5 nm/sec.

Concerning thickness of the deposited film of inorganic material, the fact is to be noted that a small film thickness tends to deteriorate alignment while a large film thickness is prejudicial to productivity. In view of this, the deposited film thickness should be 0.01 to 1,000 μm, preferably 0.05 to 100 μm, more preferably 0.1 to 5 μm.

In case of using a liquid crystal material showing the smectic C phase, it is possible to obtain a liquid crystal polymer or liquid crystal oligomer film having the optical axis with an inclination of 10–80° by forming a film of said liquid crystal material on a vertically oriented substrate and then orienting the formed film. In this case, oblique evaporation, rubbing or application of a magnetic or electric field may be employed for aligning the tilt direction of mesogen groups.

Homeotropic orientation treatment usually comprises making the substrate surface hydrophobic with a surfactant such as lecithin or a silane or titanium coupling agent, but in the case of the liquid crystal polymer or liquid crystal oligomer of the present invention, good homeotropic orientation can be obtained by making the substrate surface hydrophilic after oblique evaporation.

Known surface improving methods and techniques can be utilized for making the deposited film surface hydrophilic, for example, a method in which a hydrophilic polymer containing hydroxyl groups, carboxylate ions or sulfonate ions is coated on the substrate, or a method in which the substrate is subjected to a plasma treatment, corona discharge treatment or ozone treatment with ultraviolet rays, in an oxygen or water vapor atmosphere. As the polymer for making the film surface hydrophilic, there can be used said polymers having hydroxyl groups and the polymers having carboxylic acids. When a hydrophilic polymer is coated on the deposited film formed by oblique evaporation, the coating thickness of said hydrophilic polymer should be 1 nm to 10 μm, preferably 5 nm to 2 μm, more preferably 5 nm to 1 μm, for maximizing the effect of said hydrophilic polymer. Any type of solvent can be used in the above treatments as far as it is capable of dissolving the hydrophilic polymers, but usually water is preferably used as solvent.

In the present invention, heat treatment is employed for orienting the film in a specific direction, and it is possible to change the film characteristics such as orientation, viscosity and optimal heat treatment temperature in the more favorable ranges by mixing a low-molecular weight compound capable of lowering the liquid crystal phase/isotropic phase transition temperature of the liquid crystal oligomer.

The low-molecular weight compound to be mixed in the liquid crystal oligomer in the present invention is at least one compound selected from the group consisting of the compounds of the formulae (VI), (VII) and (VIII) shown and described above.

Referring to the low-molecular weight compounds represented by the formula (VI), $R_3$ in said formula represents an alkyl group having 3–30 carbon atoms or an alkoxy group having 3–30 carbon atoms, such as propyl, butyl, hexyl, octyl, dodecyl, octadecyl, docosyl, eicosyl, propoxy, butoxy, hexyloxy, octyloxy, dodecyloxy, octadecyloxy, docosanoxy and eicosyloxy.

$R_4$ represents halogen, cyano group, methacryloyl group, acryloyl group, an alkyl group having 1–20 carbon atoms or an alkoxy group having 1–20 carbon atoms. The alkyl groups and alkoxy groups represented by $R_4$ include methyl, ethyl, propyl, butyl, hexyl, octyl, dodecyl, octadecyl, methoxy, ethoxy, propoxy, butoxy, hexyloxy, octyloxy, dodecyloxy and octadecyloxy.

The low-molecular weight compounds represented by the formula (VI) include, as their preferred examples, the compounds of the following formula (XII):

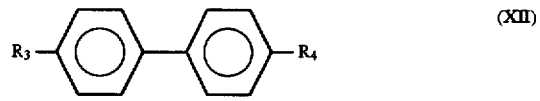

(XII)

Cyanobiphenyl-based compounds are especially preferred. Typical examples of such compounds are 4-cyano-4'-hexylbiphenyl, 4-cyano-4'-octylbiphenyl, 4-cyano-4'-octyloxybiphenyl and the like.

Referring to the low-molecular weight compounds represented by the formula (VII) $R_5$ and $R_6$ represent independently hydrogen, alkyl group having 1–20 carbon atoms or alkoxy group having 1–20 carbon atoms. The alkyl groups and alkoxy groups represented by $R_5$ and $R_6$ include methyl, ethyl, propyl, butyl, hexyl, octyl, dodecyl, octadecyl, methoxy, ethoxy, propoxy, butoxy, hexyloxy, octyloxy, dodecyloxy and octadecyloxy.

Examples of the low-molecular weight compounds represented by the formula (VII) include 4-methylbenzophenone, 4-ethylbenzophenone, 4-butylbenzophenone, 4-octylbenzophenone, 4-methoxybenzophenone, 4-ethoxybenzophenone, 4-butoxybenzophenone, 4-octyloxybenzophenone, 4,4'-dimethoxybenzophenone, 4,4'-diethoxybenzophenone, 4,4'-dibutoxybenzophenone and 4,4'-dioctyloxybenzophenone. Of these compounds, 4-methoxybenzophenone is preferred.

Referring to the low-molecular weight compounds represented by the formula (VIII), $R_7$ is hydrogen or methyl group, and $R_8$ is hydrocarbon group having 1–30 carbon atoms. The hydrocarbon groups represented by $R_8$ include methyl, ethyl, propyl, butyl, hexyl, octyl, dodecyl, octadecyl, docosyl and eicosyl.

Examples of the low-molecular weight compounds represented by the formula (VIII) include methyl acrylate, ethyl acrylate, butyl acrylate, octyl acrylate, dodecyl acrylate, octadecyl acrylate, methyl methacrylate, ethyl methacrylate, butyl acrylate, octyl methacrylate, dodecyl methacrylate and octadecyl methacrylate. Of these compounds, octadecyl methacrylate is preferred.

In the present invention, a low-molecular weight compound is blended in an amount of 0.1 to 40 parts by weight, preferably 0.5 to 25 parts by weight, more preferably 1 to 15 parts by weight, to 100 parts by weight of liquid crystal oligomer. When the amount of said low-molecular weight compound is less than 0.1 part by weight based on said oligomer, the effect of addition of said compound is nil, and when the amount exceeds 40 parts by weight, the compound may give adverse effect to the properties of the produced film.

The blending method is not specified. The compound may be blended in a state of solution, isotropic phase, etc., but blending in a state of solution is preferred for facilitation of film forming process.

The present invention is also embodied as a substrate used for a laminate of an oriented optically anisotropic film and a transparent or semitransparent substrate on which alignment treatment has been carried out. As the substrate of the homeotropically oriented optically anisotropic film, there can be used the above-mentioned glass plate and films of polymers having hydroxyl groups, carboxylic acid ions or sulfonic acid ions. It is also possible to use a transparent or semitransparent polymer film having its surface constituted by a hydrophilic polymer such as mentioned above. The form of the hydrophilic substrate used is thin plate-like or film-like when the substrate is used for a liquid crystal display device. Film is preferred for polymer material. In the case of an optically anisotropic film having the optical axis at an angle of elevation of 10–80° from the film plane, a glass plate or a transparent or semitransparent polymer film can be used as substrate, and the film is subjected to said orientation treatment. The form of the substrate used is thin plate-like or film-like. Film is preferred for polymer material.

In the laminate of an optically anisotropic film and a hydrophilic substrate according to the present invention, the hydrophilic substrate is effective for aligning the optical axis of the film substantially parallel to the direction normal to the film plane. However, since the rubbed polyvinyl alcohol film acts as a homogeneous alignment film as mentioned above, rubbing is undesirable for the hydrophilic polymer layer as such treatment gives adverse effect to alignment of the optical axis.

As the material of the transparent or semitransparent polymer film whose surface is coated with a hydrophilic polymer or of the polymer film serving as a substrate used for oblique evaporation in the present invention, there can be used polycarbonate, polysulfone, polyarylate, polyether sulfone, cellulose diacetate, cellulose triacetate, polystyrene, ethylene-vinyl alcohol copolymer, polyethylene terephthalate, polyethylene naphthalate and the like. Of these polymers, polycarbonate, polysulfone, cellulose triacetate, polyethylene terephthalate and polystyrene are preferred.

For aligning the optical axis substantially parallel to the direction normal to the film in the laminate of an optically anisotropic film and a hydrophilic substrate according to the present invention, said laminate is subjected to a heat treatment under the same conditions as in the case of the optically anisotropic film. Here, it is recommended to use a polymer which remains unchanged in optical properties or shape in the working temperature range. In the case of the thermoplastic engineering polymers with high glass transition temperature or the polymers blended with a plasticizer, those having a high flow temperature are preferably used. Glass transition temperature of the polymer used is not specified, but it is preferably 100° C. or above, more preferably 110° C. or above.

Preferred examples of the polymers which meet the above conditions are cellulose triacetate, polycarbonate, polysulfone, polyether sulfone and polyethylene terephthalate. The first four are especially preferred.

Then, in case of using a polymerizable liquid crystal oligomer, it is polymerized in the same way as the liquid crystal oligomer polymer film, and orientation is fixed.

The laminate of the present invention can take another embodiment wherein the laminate comprises an aligned polymerized liquid crystal oligomer film and a polymer substrate subjected to a hard coat treatment.

As the polymer substrate, there can be used substrates made from polycarbonates, polysulfones, polyallylates, polyether sulfones, cellulose diacetate, cellulose triacetate, polystyrenes, ethylene-vinyl alcohol copolymers, polyethylene terephthalates, polyethylene naphthalates, etc. Among these polymers, polycarbonates, polysulfones, polyethylene terephthalates and polystyrenes are preferable.

The term "hard coat treatment" means a treatment of a surface of the polymer substrate with a hard coat agent, e.g. coating, or formation of a hard coat layer thereon so as to make the substrate surface harder than the untreated strate in terms of a pencil hardness.

As the hard coat agent, there can be used conventional hard coat agents. The formation of the hard coat layer can be carried out by, conventional processes. It is preferable to use a hard coat agent or a hard coating process so as to give a hard coat layer having a thickness of 2 μm or more or a surface hardness of HB or more in terms of the pencil hardness, preferably a thickness of 5 μm or more, or the surface hardness of H or more.

As the hard coat agent, there can be used conventionally used polyurethane series, acryl oligomer series, acryl-silicone series, organopolysiloxane series, and inorganic compounds, which are disclosed in Plastic Coating Technical Handbook (pages 183–191, published by Sangyo Gijutsu Service Center Ltd.). From the viewpoint of alignment of liquid crystal oligomers, the use of unsaturated polyesters of photocurable resin type, urethane-acrylate resins epoxy-acrylate resins, polyester-acrylic resins, organopolysilocanes and inorganic compounds is preferable among these examples. Further, from the viewpoint of film-forming property, the use of photocurable type resins, acryl oligomers and organosiloxanes is more preferable as the hard coat agent.

In the case of forming a liquid crystal oligomer layer on the hard coat treated polymer substrate, there can be carried out a conventional surface modifying technique such as a plasma treatment, a corona treatment, ultraviolet radiation, a saponification treatment upon the hard coat layer so as to enhance surface tension of the polymer film, resulting in improving the uniformity of film formed.

The hard coated polymer substrate can be prepared by film forming a hard coat agent or a surface of a transparent or semi-transparent polymer film used as a substrate. As the polymer for the polymer substrate, there can be used polycarbonates, polysulfones, polyallylates, polyether sulfones, cellulose diacetate, cellulose triacetate, polystyrenes, ethylene-vinyl acetate copolymers, polyethylene terephthalates, polyethylene naphthalates, etc.

As the film forming process of hard coat agent, there can be used conventional coating methods such as a roll coating method, a dipping method, a gravure coating method, a bar coating method, a spin coating method, a spray coating method, and a print coating method using dissolved or dispersed state of the hard coat agent in a solvent; and conventional evaporation methods such as a sputtering method in vacuum, an electron beam heating evaporation method, a resistance heating method, etc. After film formation, curing of the resulting film can be carried out by ultraviolet irradiation, heat treatment, or the like depending on the kind of hard coat agent used.

When the film is formed by the evaporation method, care should be taken as to the direction of evaporation. The use of oblique evaporation is not preferable due to giving undesirable influences on the optical axis of the aligned liquid crystal oligomer.

Now, a process of making a laminate of substrate subjected to an alignment treatment and an optically anisotropic film according to the present invention is described by taking up the case where a substrate formed by applying a hydrophilic polymer on the surface of a polymer film and a liquid crystal oligomer are used. First, a film of a hydrophilic polymer is formed on the surface of a transparent or semitransparent polymer film, such as a film of polycarbonate, polysulfone, polyarylate, polyether sulfone, cellulose diacetate, cellulose triacetate, polyethylene terephthalate, polyethylene naphthalate or the like.

The method of forming a film of a hydrophilic polymer is not specified in this invention. For example, the film can be formed by dissolving said polymer in a solvent which can dissolve said polymer but scarcely causes dissolution or swelling of the substrate, and the solution is coated on the substrate by a known coating method such as gravure coating, bar coating, spin coating, spray coating, printing, dipping, etc., or the polymer is melted and coated on the substrate by a known coating method such as roll coating, gravure coating, bar coating, spray coating, dipping, etc.

In view of easiness of operation, it is recommended to form the film from a polymer solution by using such coating method as roll coating, gravure coating, bar coating, spin coating, spray coating or dipping.

Some types of polymer film, such as the films of polycarbonate, polystyrene, polyarylate and polyether sulfone, are small in surface tension and may repel the hydrophilic polymer solution, so that in case of using such films, they may be subjected to a known surface treatment, such as plasma treatment, corona discharge, ultraviolet irradiation, etc., for increasing the surface tension of the film before forming thereon a film of a hydrophilic polymer.

The thickness of the transparent or semitransparent polymer film used in this invention is not critical, but it is preferably 1 to 500 µm, more preferably 10 to 300 µm, still more preferably 40 to 200 µm.

The thickness of the hydrophilic polymer film is also not critical, but it is usually 0.1 to 500 µm, preferably 0.5 to 100 µm, more preferably 1 to 50 µm. As for the solvent, any solvent capable of dissolving the hydrophilic polymer can be used, but it is recommended to use water for economical reason.

Then, a film of a liquid crystal oligomer is formed on the hydrophilic polymer film. The film forming method is not specified. For example, the film can be formed by dissolving a liquid crystal oligomer in a solvent which can dissolve said liquid crystal oligomer but scarcely causes dissolution or swelling of the substrate or hydrophilic polymer, and coating the solution on the substrate by a known coating method such as roll coating, gravure coating, bar coating, spin coating, spray coating, printing, dipping, etc., or by heating said liquid crystal oligomer to a temperature above the solid phase/liquid crystal phase transition temperature of said liquid crystal oligomer to reduce its viscosity, and then coating it on the substrate by a suitable coating method such as roll coating, gravure coating, bar coating, spray coating, dipping, etc. In view of easiness of operation, it is recommended to form the film from a liquid crystal oligomer solution by using such coating method as roll coating, gravure coating, bar coating, spin coating, spray coating or dipping.

The thickness of the thus formed liquid crystal oligomer layer is preferably 0.1 to 20 µm, more preferably 0.5 to 10 µm, even more preferably 1 to 7 µm. When the layer thickness is less than 0.1 µm, the layer may fail to develop the optical properties of the liquid crystal oligomer to a satisfactory degree, and when the layer thickness is greater than 20 µm, orientation becomes hard to conduct.

As described above, for obtaining a high degree of homeotropic orientation of the liquid crystal oligomer, the liquid crystal oligomer/polymer laminated film is heat-treated at the same temperature for the same period of time as in the case of the aforementioned liquid crystal oligomer polymer film. However, in the case of a substrate having certain glass transition temperature or a substrate incorporated with certain additives, there tends to take place deformation of the substrate or hydrophilic polymer layer formed on a substrate when the working temperature is above the flow temperature of the substrate, so that the upper limit of working temperature is preferably set below the glass transition temperature or flow temperature of the substrate. By this treatment, the liquid crystal oligomer film on the polymer substrate is substantially vertically oriented. The heating rate and cooling rate in the heat treatment are not critical.

In the case of a polymerizable liquid crystal oligomer, it is polymerized after orientation in the same way as in the case of liquid crystal oligomer polymer.

For producing a transparent or semitransparent polymer film of this invention, there can be employed a suitable molding method such as solvent casting, extrusion molding or press molding.

A laminate of a liquid crystal oligomer polymer and a substrate can be similarly obtained when using a glass plate or a hydrophilic polymer film as substrate.

In the oriented liquid crystal oligomer polymer film or the laminate of an oriented liquid crystal oligomer polymer film and a hydrophilic substrate according to the present invention, the optical axis is substantially parallel to the normal line of the film, so that by using a plural number of the uniaxially oriented retardation films having the optical axis in the film plane, said films also having positive anisotropy of refractive index and made of a thermoplastic polymer, it is possible to make a composite retardation plate or composite retardation film. Also, in the laminate of an optically anisotropic film and substrate subjected to an alignment treatment according to the present invention, the optical axis is inclined 10–80°, in terms of angle of elevation, from the film plane, so that by using the uniaxially oriented retardation films having the optical axis in the film plane, which films have positive anisotropy of refractive index and are made of a thermoplastic polymer, it is possible to make a composite retardation plate or composite retardation film. Hereinafter, the composite retardation plate and composite retardation film are referred to representatively as composite retardation plate.

It is known in this art that the viewing width of composite retardation plate relates to the maximum value ($n_x$) of the in-plane refractive index of the composite retardation plate, the minimum value ($n_y$) of the in-plane refractive index of the composite retardation plate, and the refraction index ($n_z$) in the thickness direction of the composite retardation plate.

The anisotropy of refraction index can be obtained as an arithmetic mean of refractive indexes of individual constituting material plates and films. Since the composite retardation plate shows retardation, it is practical to estimate the anisotropy of refractive index from the angular dependence of retardation.

When the anisotropy of refractive index is evaluated by the ratio $R(\theta)/R(0)$, wherein $R(0)$ is retardation in the vertical direction to the composite retardation plate; and $R(\theta)$ is the retardation inclined at an angle of $\theta$ degree, a good viewing angle property is shown in the range of:

$$1.10 > R(40°)/R(0) > 0.90$$

corresponding to:

$$n_x > n_z > n_y$$

As examples of the thermoplastic polymers having positive refractive index anisotropy usable for the composite retardation plate of the present invention, there can be mentioned, for instance, polycarbonate, polysulfone, polyarylate, polyether sulfone, cellulose diacetate, cellulose triacetate, polyvinyl alcohol, polyethylene-vinyl alcohol copolymer and polyethylene terephthalate. A film of such thermoplastic polymer is uniaxially oriented and used as a retardation film.

The laminate of liquid crystal oligomer/hydrophilic substrate and the uniaxially oriented retardation film may be bonded to each other with a binder or other means to form a laminate, or they may be used separately from each other.

For producing a film (base film) used as base of a retardation film made of a thermoplastic polymer such as mentioned above, a suitable molding method such as solvent casting, extrusion molding or press molding can be employed. For stretching the base film for making a uniaxially oriented retardation film having the optical axis in the film plane, there can be employed the known stretching methods such as tentering, roll stretching and roll compression stretching. For obtaining a homogeneous retardation film, preferably a film formed by solvent casting is stretched by tentering.

In the liquid crystal display device of the present invention, the position of the optically anisotropic film, the laminate of an optically anisotropic film and a hydrophilic substrate, or the composite retardation plate containing an optically anisotropic film, is not specified; they may be placed at any position between a pair of polarizing plates of a liquid crystal display. For instance, they may be disposed between a polarizing plate and a liquid crystal cell for display, between a polarizing plate and a polarizing plate protective film, between a retardation film and a polarizing plate, between a retardation film and a liquid crystal cell for display. Further, an aligned polymerized liquid crystal oligomer film can be positioned at either a near sider or a far side of the liquid crystal cell. In order to obtain a liquid crystal display device having a wider viewing angle, it is preferable to position the aligned polymerized liquid crystal oligomer film between a uniaxially oriented retardation film and a polarizing film.

The present invention is further illustrated below with reference to the examples thereof, which examples however are merely intended to be illustrative and not to be construed as limiting the scope of the invention.

The glass transition point and liquid crystal phase/isotropic phase transition temperature of the obtained liquid crystal oligomers were determined by observation with a polarization microscope and a differential scanning calorimeter (DSC). That is, each liquid crystal oligomer was scanned at a rate of 10° C./min, and the transition temperature was determined from the data of the second and ensuing runs of scanning. As for Tg, the peak of primary differential of the endothermic curve during rise of temperature was regarded as Tg, and as to Ti, the endothermic peak supposed to be due to liquid phase/isotropic phase transition was regarded as Ti.

For confirmation of the fact that the obtained laminate of a liquid crystal oligomer polymer film and a substrate had the optical axis substantially in the direction normal to the film plane, it was observed whether extinction would take place almost perfectly when said laminated film was placed horizontally under crossed nicols in case the substrate had no birefringence, and then it was further observed whether retardation would enlarge with increase of inclination of the film about an optionally selected axis.

For evaluating the laminated composite retardation plate or film of the present invention, first in-plane double refraction of said plate or film was examined. Said laminated film was placed in a polarization microscope equipped with a tilting stage, and retardation (R(0)) was determined according to Sénarmont's double refraction measuring method using Sénarmont compensator.

Then double refraction in the thickness direction was evaluated with reference to retardation (R(θ)) determined with the optical axis in the homogeneous plane being inclined by an angle of θ.

As for the viewing angle of the laminated composite retardation plate or film, the angle θ when R(θ)=1.10×R(0) was defined as the viewing angle of said plate or film.

The present invention is illustrated by way of the following Examples, in which all percents are by weight unless otherwise specified.

EXAMPLE 1

A 7% aqueous solution of polyvinyl alcohol (Poval 117, produced by Kuraray Co., Ltd.) was coated on an 80 μm thick cellulose triacetate film and dried in hot air of 100° C. The resultantly obtained polyvinyl alcohol film was 3 μm thick.

A 1:1 mixture of 4-(allyloxy)-benzoic acid-4'-cyanophenyl ester and 4-(allyloxy)-benzoic acid-(4'-methacryloyloxyphenyl) ester was reacted with pentamethylcyclopentasiloxane in the same way as described in U.S. Pat. No. 4,410,570 to obtain a liquid crystal oligomer comprising, as its main structural units, cyclic pentasiloxane oligomer having in its side chain nonpolymerizable mesogen groups and polymerizable mesogen groups in a ratio of about 1:1. Elemental analysis of this liquid crystal oligomer showed C=61.7, H=5.3, and N=2.0. The content of the cyclic pentasiloxane liquid crystal oligomer as determined in terms of gel permeation chromatographic areal percentage was 69%, and that of the unreacted monomer was 4.5%. The addition rate of side chain mesogen as determined from integration of the peak on H-NMR spectrum was about 80%.

Tg of the obtained liquid crystal oligomer was 18.7° C., and Ti was 117.5° C. This liquid crystal oligomer was dissolved in methylene chloride to a concentration of 5 wt %, and then Irgacure 907 (produced by Ciba-Geigy AG) was mixed as photopolymerization initiator in an amount of 2 wt % based on the liquid crystal oligomer. This liquid crystal oligomer solution was applied on a polyvinyl alcohol-coated cellulose triacetate film by using an applicator with a gap width of 40 μm, followed by during at room temperature. The resultantly formed liquid crystal oligomer film was cloudy.

The thus obtained liquid crystal oligomer/polyvinyl alcohol/cellulose triacetate laminated film was heated on a 95° C. hot plate for 5 minutes and then cooled. Then this laminated film was irradiated with light from a high pressure mercury lamp at a light intensity of 500 mW/cm² on the irradiated surface.

The obtained liquid crystal oligomer polymer/polymeric compound laminated film became optically extinct under crossed nicols and showed retardation of 5.3 nm which was supposed to be ascribable to cellulose triacetate, but retardation enlarged when the laminated film was inclined from the homogeneous plane. The relation between inclination angle and retardation is shown in FIG. 1. In view of the fact that retardation enlarges with increase of inclination angle, it is seen that the liquid crystal oligomer polymer is oriented vertically. The thickness of this liquid crystal oligomer polymer layer measured by using a needle surface profiler as a thickness meter (Alpha Step AS-200 mfd. by Tencor Co.) was 2.3 μm.

Then, in order to obtain a uniaxially oriented retardation film having the optical axis in the film plane, said film also having positive anisotropy of refractive index and made of a thermoplastic polymer, an 80 μm thick polycarbonate base film was formed by solvent casting, and this base film was stretched 1.2 times at 185° C. by longitudinal uniaxial stretching method. The obtained polycarbonate retardation film had a thickness of 66 μm and a viewing angle of 39° with R(0)=380 nm.

When this polycarbonate retardation film and a liquid crystal oligomer polymer/polymeric compound laminated film were laminated, the viewing angle became greater than 60°, and there was obtained a composite retardation film with a greater viewing angle than that of the polycarbonate retardation film alone. Further, when this composite retardation film is placed between the upper polarizing plate and the corresponding liquid crystal cell of an STN type liquid crystal display device, black and white display is given, and the film shows excellent viewing angle characteristics.

COMPARATIVE EXAMPLE 1

The procedure of Example 1 was carried out except that no heat treatment was conducted after coating of the liquid crystal oligomer to obtain a laminated film of a liquid crystal oligomer polymer and a polymeric substance. The obtained laminated film was cloudy.

Observation of the laminated film under crossed nicols confirmed cloudiness of the film and showed that the liquid crystal oligomer polymer was not oriented vertically.

EXAMPLE 2

The procedure of Example 1 was followed except that sodium alginate was used in place of polyvinyl alcohol to obtain a laminated film of a liquid oligomer polymer film and a polymeric substance. This laminated film was transparent under crossed nicols and showed retardation of only 3 nm, but when the film was inclined from the homogeneous plane, retardation enlarged. It was 105 nm when the film was tilted 50°. As retardation enlarged proportionally to the inclination, it was confirmed that the liquid crystal oligomer polymer layer was oriented vertically.

When the polycarbonate retardation film used in Example 1 and said laminated film were laminated, the viewing angle became greater than 60°, and there was obtained a composite retardation film with a greater viewing angle than that of the polycarbonate retardation film alone.

When this composite retardation film is placed between the upper polarizing plate and the corresponding liquid crystal cell of an STN type liquid crystal display device, black and white display is given and the film shows excellent viewing angle characteristics.

EXAMPLE 3

The procedure of Example 1 was followed except that the cellulose triacetate film was replaced by a polycarbonate retardation film (viewing angle: 39°) with R(0)=380 nm prepared by the same method as used in Example 1 to obtain a laminated film of a liquid crystal oligomer polymer film and a polymeric substance.

This laminated film showed retardation of 382 nm, which was almost equal to retardation of the polycarbonate retardation film alone. There took place little change of retardation even when the laminated film was tilted from the homogeneous plane, while the viewing angle was greater than 60°, indicating a remarkable improvement of viewing angle as compared with that of the single retardation film.

When this composite retardation film is placed between the upper polarizing plate and the corresponding liquid crystal cell of an STN type liquid crystal display device, black and white display is given and the film shows excellent viewing angle characteristics.

EXAMPLE 4

The procedure of Example 1 was repeated except for use of a nonstretched polysulfone film in place of the cellulose triacetate film to obtain a laminated film of a liquid crystal polymer film and a polymeric substance. Retardation of this laminated film was 3 nm, about the same as retardation of the nonstretched polysulfone film alone. Retardation enlarged when the laminated film was tilted from the homogeneous plane. Retardation at inclination of 60° was 64 nm. As retardation enlarged with increase of film inclination, it was confirmed that the liquid crystal oligomer polymer layer was oriented vertically.

When the polycarbonate retardation film used in Example 1 and said laminated film were laminated, the viewing angle became greater than 60° and there was obtained a composite retardation film with a greater viewing angle that of the single polycarbonate retardation film.

When this composite retardation film is placed between the upper polarizing plate and the corresponding liquid crystal cell of an STN type liquid crystal display device, black and white display is given and the film shows excellent viewing angle characteristics.

EXAMPLE 5

The procedure of Example 1 was followed except that the cellulose triacetate film was replaced by a glass plate and that no polyvinyl alcohol was used to obtain a laminated film of a liquid crystal oligomer polymer film and glass. The obtained laminated film was transparent under crossed nicols and showed zero retardation. But retardation appeared and enlarged as the laminated film was tilted from the homogeneous a plane. Retardation at 50° inclination was 99 nm. In view of the fact that retardation enlarged with increase of tilt angle of the film, it was confirmed that the liquid crystal polymer layer was oriented vertically.

The thickness of the liquid crystal oligomer polymer layer was 2.0 μm. When said laminated film and a polycarbonate retardation film were laminated, the viewing angle became greater than 60° and there was obtained a composite retardation film with a greater viewing angle than that of the single polycarbonate retardation film.

When this composite retardation film is placed between the upper polarizing plate and the corresponding liquid crystal cell of an STN type liquid crystal display device, black and white display is given and the film shows excellent viewing angle characteristics.

EXAMPLE 6

A 7% aqueous solution of polyvinyl alcohol (Poval 117, produced by Kuraray Co., Ltd.) was coated on an 80 μm thick cellulose triacetate film and dried in hot air of 100° C. The formed polyvinyl alcohol film was 2 μm thick.

A cyclic pentasiloxane liquid crystal oligomer obtained in Example 1 was dissolved in methylene chloride to a concentration of 10 wt %. In this solution were mixed 4-cyano-4'-hexylbiphenyl and, as photo-polymerization initiator, Irgacure 907 (produced by Ciba-Geigy AG) in amounts of 3 wt % and 2 wt %, respectively, based on the liquid crystal oligomer. The thus prepared liquid crystal oligomer composition solution was coated on a polyvinyl alcohol-coated cellulose triacetate film by using a bar coater and dried at room temperature. The resultantly formed liquid crystal oligomer composition film was cloudy.

The thus obtained three-layer (liquid crystal oligomer composition/polyvinyl alcohol/cellulose triacetate) laminated film was heated in a 70° C. thermostat for 5 minutes and then irradiated with light from a high pressure mercury lamp at alight intensity of 500 mW/cm² on the irradiated surface.

The obtained laminated film of liquid crystal oligomer polymer composition and polymeric substance became extinct under crossed nicols and showed retardation of 5.3 nm which was supposed to be attributable to cellulose triacetate, but retardation enlarged when the laminated film was tilted from the homogeneous plane. Retardation at 60° inclination was 77 nm. The haze of this film as measured by a hazemeter (Direct-reading Haze Computer HGM-2DP mfd. by Suga Shikenki Co., Ltd.) was 3.2%.

When the polycarbonate retardation film obtained in Example 1 and said laminated film were laminated, the viewing angle became greater than 60° and there was obtained a composite retardation film with a greater viewing angle than that of the single polycarbonate retardation film.

When this composite retardation film is placed between the upper polarizing plate and the corresponding liquid crystal cell of an STN type liquid crystal display device, black and white display is given and the film shows excellent viewing angle characteristics.

Said composite retardation film may be bonded to the upper polarizing plate of an STN type liquid crystal display device by a butyl acrylate type binder, and in this case, too, the film shows excellent visual field characteristics.

EXAMPLE 7

The procedure of Example 6 was carried out except for use of 8 wt % of 4-cyano-4'-octyloxybiphenyl in place of 4-cyano-4'-hexylbiphenyl to obtain a laminated film of an oriented liquid crystal oligomer polymer composition and a polymeric substance. The obtained laminated film became extinct under crossed nicols and showed retardation of 5.3 nm which was supposed to be due to cellulose triacetate, but retardation enlarged when the film was tilted from the homogeneous plane. Retardation at 60° inclination was 50 nm. The haze of this laminated film as measured by a hazemeter was 1.4%.

When the polycarbonate retardation film and said laminated film were laminated, the viewing angle became greater than 60° and there was obtained a composite retardation film with a greater viewing angle than that of the single polycarbonate retardation film.

When this composite retardation film was placed between the upper polarizing plate and the corresponding liquid crystal cell of an STN type liquid crystal display device, black and white display was given and the film showed excellent viewing angle characteristics.

EXAMPLE 8

A 7% aqueous solution of polyvinyl alcohol (Poval 117, produced by Kuraray Co., Ltd.) was coated on an 80 μm thick cellulose triacetate film and dried in 100° C. hot air. The formed polyvinyl alcohol film was 2 μm thick.

The 5-membered ring pentasiloxane liquid crystal oligomer obtained in Example 1 was dissolved in methylene chloride to a concentration of 10 wt %, and in this solution was mixed 4-methoxybenzophenone in an amount of 10 wt % per 100 wt % of liquid crystal oligomer. Further, Irgacure 907 as a photopolymerization initiator was mixed in an amount of 2% based on the weight of the liquid crystal oligomer. The thus prepared solution was coated on a polyvinyl alcohol-coated cellulose triacetate film by using a bar coater. The obtained oriented liquid crystal oligomer composition film was cloudy.

The thus obtained three-layer (liquid crystal oligomer composition/polyvinyl alcohol/cellulose triacetate) laminated film was heated in a 55° C. thermostat for 5 minutes and then irradiated with light from a high pressure mercury lamp at alight intensity of 500 mW/cm² on the irradiated surface.

The obtained laminated film of oriented liquid crystal oligomer polymer composition and polymeric substance became extinct under crossed nicols and showed retardation of 5.3 nm which was supposed to be due to cellulose triacetate, but retardation enlarged when the film was tilted from the homogeneous plane. Retardation at 60° inclination was 55 nm. The haze of the film as measured by a hazemeter was 2.2%.

When this laminated film and the polycarbonate retardation film used in Example 6 were laminated, the viewing angle became greater than 60° and there was obtained a composite retardation film with a greater viewing angle than that of the single polycarbonate retardation film.

Also, when this composite retardation film is placed between the upper polarizing plate and the corresponding liquid crystal cell of an STN type liquid crystal display device, black and white display is given and the film shows excellent viewing angle characteristics.

EXAMPLE 9

The procedure of Example 6 was followed except for use of 3 wt % of octadecyl methacrylate in place of 4-cyano-4'-hexylbiphenyl to obtain a laminated film of an oriented liquid crystal oligomer polymer composition film and a polymeric substance. The obtained laminated film became extinct under crossed nicols and showed retardation of 5.3 nm which was supposed to be attributable to cellulose triacetate, but retardation enlarged when the film was tilted from the homogeneous plane. Retardation at 60° inclination was 70.0 nm. The haze of the film as measured by a hazemeter was 1.8%.

When the polycarbonate retardation film used in Example 6 and said laminated film were laminated, the viewing angle became greater than 60° and there was obtained a composite retardation film with a greater viewing angle than that of the single polycarbonate phase difference film.

When this composite retardation film is placed between the upper polarizing plate and the corresponding liquid crystal cell of an STN type liquid crystal display device, black and white display is given and the film shows excellent viewing angle characteristics.

EXAMPLE 10

The procedure of Example 6 was followed except that no polycarbonate retardation film was laminated to obtain a laminate of an oriented liquid crystal oligomer polymer film and a hydrophilic substrate. When this laminate is placed between a polarizing plate and the corresponding liquid crystal cell of a homogeneously oriented ECB type liquid crystal display device, it shows excellent viewing angle characteristics.

COMPARATIVE EXAMPLE 2

The procedure of Example 6 was followed except that no heat treatment was conducted after coating of the liquid crystal oligomer composition to obtain a laminated film of a liquid crystal oligomer polymer composition and a polymeric substance. The obtained laminated film was cloudy.

When observed under crossed nicols, the laminated film was cloudy and it was found that the liquid crystal oligomer polymer composition was not oriented vertically.

EXAMPLE 11

4-(allyloxy)-benzoic acid-4'-cyanophenyl ester was reacted with pentamethylcyclopentasiloxane in the same way as described in U.S. Pat. No. 4,410,570 to obtain a polymer having a cyclic pentasiloxane liquid crystal oligomer as main structural unit. This liquid crystal polymer showed the nematic phase and its liquid phase/isotropic phase transition temperature was 97° C. This liquid crystal polymer was dissolved in acetone to a concentration of 15 wt %. A glass substrate was subjected to ultrasonic cleaning with a detergent (Clean Ace produced by Shoko Tsusho Co., Ltd.). The contact angle of this substrate against water was 30.3°. The liquid crystal polymer solution was coated on this glass substrate by a spin coater (1H-DX, Mikasa Co., Ltd.) and dried.

The obtained liquid crystal polymer film was cloudy. The glass substrate wa heated on a 130° C. hot plate for 10 minutes. Then, with the glass substrate left on the hot plate, the hot plate was switched off and the glass substrate was cooled gradually down to room temperature over a period of 4 hours. The cooled liquid crystal polymer was transparent under crossed nicols and showed zero retardation, but as retardation appeared when the liquid crystal polymer film was tilted from the homogeneous plane, it was found that the film was oriented vertically.

A 185 µm thick polycarbonate base film was obtained by solvent casting, and this base film was stretched 2.1 times at 184° C. by transverse uniaxial stretching. The obtained polycarbonate phase difference film was 98 µm thick and its viewing angle (θ=1.10) was 31°, with R(0)=572 nm.

When this polycarbonate retardation film and the liquid crystal polymer film on the glass substrate were laminated, the viewing angle was greater than 45° and there was obtained a composite retardation film with a greater viewing angle than that of the single polycarbonate retardation film.

This enlargement of viewing angle is indicative of homeotropic orientation of the liquid crystal polymer film.

COMPARATIVE EXAMPLE 3

The process of Example 11 was carried out except that the glass substrate coated with the liquid crystal polymer was not heated to obtain a liquid crystal polymer film. When observed under crossed nicols, the obtained liquid crystal polymer film showed a minute Schlielen texture.

This liquid crystal polymer film and the retardation film obtained in Example 11 were laminated to obtain a composite retardation film. This composite retardation film, when observed visually, was cloudy. Its viewing angle was 32.7°, not much different from that of the liquid crystal polymer film.

EXAMPLE 12

When a glass substrate was subjected to oxygen plasma treatment, its contact angle against water became 5.2°. A 1.1 µm thick liquid crystal polymer film was obtained by following the same procedure as Example 11 except that the film was made hydrophilic. This liquid crystal polymer film and the retardation film obtained in Example 11 were laminated to obtain a composite retardation film. The viewing angle of this composite retardation film was over 45°, greater than that of the original retardation film.

EXAMPLE 13

When a glass substrate was treated with a silane coupling agent (AY43-021 produced by Toray Silicone Co., Ltd.) to make it hydrophobic, the contact angle against water became 87.4°. A 1.5 µm thick liquid crystal polymer film was obtained in the same way as Example 11 except that the glass substrate, after heating, was placed on a 20° C. stainless plate and cooled quickly. This liquid crystal retardation film and the retardation film obtained in Example 1 were laminated to obtain a composite retardation film. The viewing angle of this composite retardation film was over 45°, greater than that of the original retardation film.

EXAMPLE 14

Polyvinyl alcohol (for oriented liquid crystal film, produced by EHC Inc.) was spin coated on a glass substrate to obtain a polyvinyl alcohol substrate. The contact angle of this substrate against water was 45.2°. An acetone solution of the same liquid crystal polymer as used in Example 1 was spin coated on said polyvinyl alcohol substrate, followed by the same heat treatment as conducted in Example 11 to obtain a 0.7 µm thick liquid crystal polymer film. The viewing angle of this composite retardation film was 37.5°, greater than that of the original retardation film.

EXAMPLE 15

The polycarbonate base film used in Example 11 was bonded to a glass substrate and subjected to ultrasonic cleaning with a detergent, and polyvinyl alcohol was coated thereon in the same way as Example 14. The contact angle of this substrate against water was 45.2°. A liquid crystal polymer film was formed on this substrate according to the process of Example 4 and then heat treated in the same way as Example 11 to obtain a 1.6 µm thick liquid crystal polymer film. This liquid crystal polymer film and the polycarbonate retardation film obtained in Example 1 were laminated so that the delayed phase axes of the respective films would agree with each other to obtain a composite retardation film. The viewing angle of this composite retardation film was 32.0°, greater than that of the composite retardation film obtained in Comparative Example 4.

COMPARATIVE EXAMPLE 4

The polycarbonate base used in Example 11 was bonded to a glass substrate. Then this polycarbonate base-bonded substrate and the polycarbonate retardation film with R=512 nm made in the same way as Example 1 were laminated so that the delayed phase axes of the respective films would agree with each other to obtain a composite retardation film. The viewing angle of this composite retardation film was 29.0%. Thus, the viewing angle became smaller when the two polycarbonate films were laminated so that their delayed phase axes would agree with each other.

COMPARATIVE EXAMPLE 5

A polycarbonate base film was treated according to Example 15 except that no polyvinyl alcohol was coated. Its contact angle against water was 80.5°. An acetone solution of a liquid crystal polymer, same as used in Example 11, was spin coated on said substrate to obtain a liquid crystal polymer film. This film was heat treated according to Example 11 or Example 13, but as observed under crossed nicols, it showed a Schlielen texture and was not oriented vertically. This liquid crystal polymer film on polycarbonate substrate and the retardation film obtained in Example 11 were laminated so that their delayed phase axes would agree with each other to obtain a composite retardation film. This composite retardation film was cloudy, and its viewing angle differed from place to place of the film, indicating that this film was impractical.

EXAMPLE 16

A cleaned glass substrate was masked with a cellophane adhesive tape and set in an evaporator. Evaporation was carried out by adjusting the substrate angle so that the evaporated $SiO_2$ would be applied to the substrate at an angle of elevation of 10° from the substrate surface. Evaporation pressure was below $3 \times 10^{-3}$ Pa. After evaporation, the cellophane adhesive tape was removed and the coated substrate was washed with acetone. The $SiO_2$ coating film was 500 nm thick.

4-(allyloxy)-benzoic acid-4'-methoxyphenyl ester was reacted with pentamethylcyclopentasiloxane by the method shown in U.S. Pat. No. 4,410,570 to obtain a cyclic pentasiloxane liquid crystal polymer. This liquid crystal polymer showed nematic phase. This polymer was dissolved in methylene chlorideto a 10% concentration and the solution was spin coated on the $SiO_2$-coated substrate.

The obtained laminate was cloudy when observed under crossed nicols and 1.8 μm thick. The obtained film was heated at 60° C. for 3 minutes and then observed under crossed nicols. It was found that at the $SiO_2$-deposited area, the liquid crystal polymer was uniformly oriented.

Figure 2:
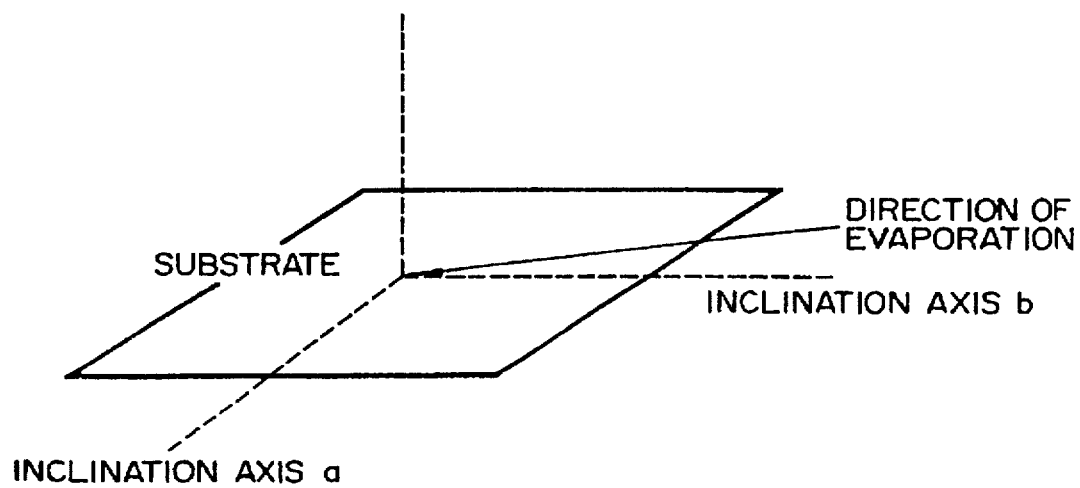
FIG. 2 is a schematic layout at the time of measurement of transmitted light quantity described in Example 17.
Figure 3:
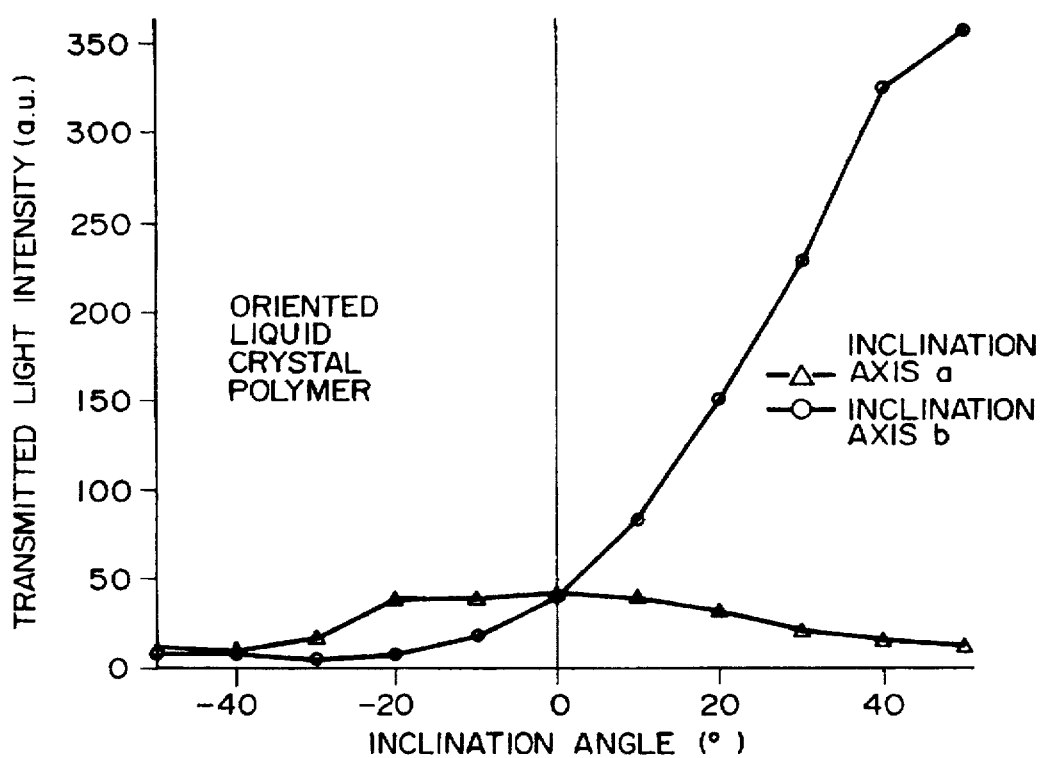
FIG. 3 is a graph showing the relationship between inclination angle and transmitted light quantity under crossed nicols in Example 16.

FIG. 2 shows diagrammatically the direction of evaporation and the inclination axis at the time of measurement of transmitted light intensity, and FIG. 3 shows change of transmitted light intensity when the inclination axis was tilted. From FIG. 3, it is seen that extinction takes place when the laminate is turned 30° about the inclination axis b, and that the liquid crystal polymer is oriented with an inclination of 60°, in terms of angle of elevation, from the film plane.

COMPARATIVE EXAMPLE 6

The procedure of Example 16 was followed except that the portion of the glass substrate masked with a cellophane adhesive tape was used as substrate. The obtained laminate, as examined under crossed nicols, had a Schlielen texture. Since no extinction zone was observed when the laminate was turned in the substrate plane, it was confirmed that the laminate was not oriented in the substrate plane. It was also found that since no extinction zone was admitted when the laminate was tilted about the inclination axis a or b, the laminate had no slant orientation.

EXAMPLE 17

A 10% aqueous solution of polyvinyl alcohol (Poval 117, Kuraray Co., Ltd.) was coated on an 80 μm thick cellulose triacetate film and dried in 100° C. hot air. The polyvinyl alcohol coating was 2 μm thick. The procedure of Example 16 was followed except that the obtained film was used as substrate to obtain a laminate of an oriented liquid crystal polymer film and a substrate.

The obtained laminate was cloudy and 1.8 μm thick. The obtained film was heated at 60° C. for 3 minutes and then observed under crossed nicols. It was found that the liquid crystal polymer was uniformly oriented at the portion where $SiO_2$ was deposited.

Figure 4:
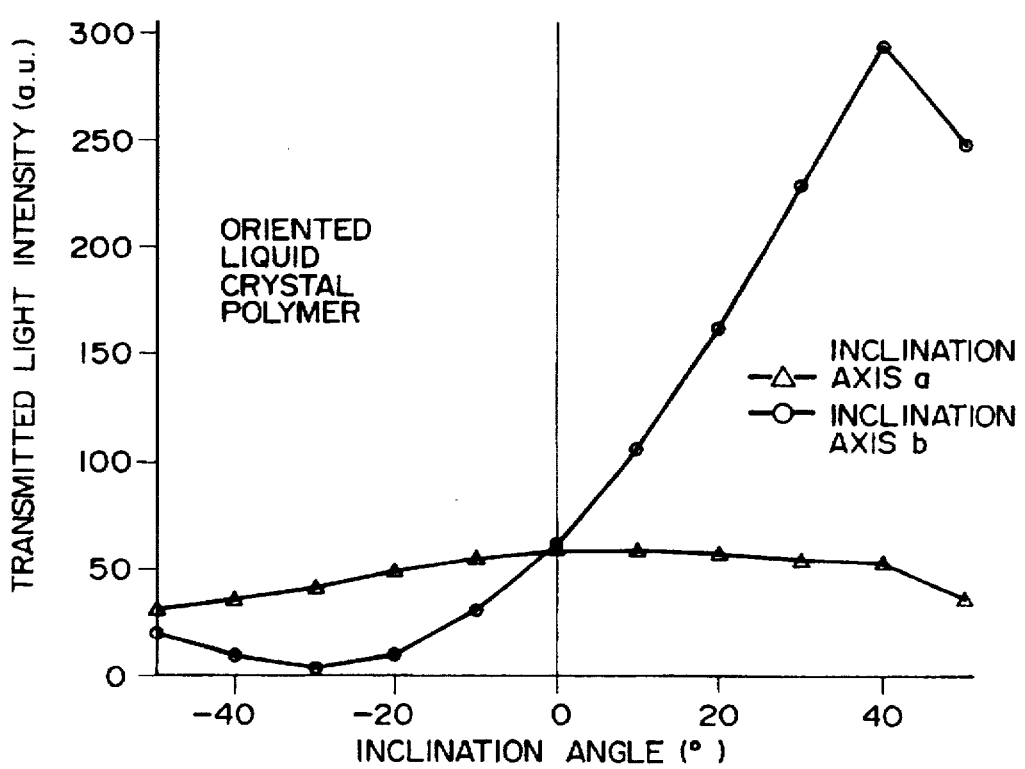
FIG. 4 is a graph showing the relationship between inclination angle and transmitted light quantity under crossed nicols in Example 17.

FIG. 2 shows diagrammatically the direction of evaporation and the inclination axis at the time of measurement of transmitted light intensity, and FIG. 4 shows change of transmitted light intensity when the laminate was turned about said inclination axis. It is seen from FIG. 4 that extinction occurs when the laminate is turned 30° about the inclination axis b, and that the liquid crystal polymer is oriented with an inclination of 30° from the direction normal to the laminate.

By using the oriented liquid crystal polymer film or oriented liquid crystal oligomer polymer film with the optical axis inclined 10–80°, in terms of angle of elevation, from the film plane according to the present invention, or by laminating such film and a transparent or semitransparent film of a polymeric substance or combining said film with a uniaxially oriented retardation film, it is possible to obtain a composite retardation plate with a large viewing angle.

Also, by applying said film or laminate to an STN type liquid crystal display device, it is possible to remarkably improve the display characteristics, especially viewing angle characteristics, of the display device.

By using an optically anisotropic film having the optical axis substantially parallel to the normal line of the film, or by laminating such film and a transparent or semitransparent film of a polymeric substance, or by combining said film with a uniaxially oriented retardation film, it is possible to obtain a composite retardation plate with a large viewing angle.

Further, by using an oriented optically anisotropic film having the optical axis inclined 10–80° from the film plane, or by laminating such film and a transparent or semitransparent film of a polymeric substance, or by combining said film with a uniaxially oriented retardation film, there can be obtained a composite retardation plate with a large viewing angle.

Also, by applying said film or laminate to an STN type or homogeneously aligned ECB type liquid crystal display device, it is possible to remarkably improve the display characteristics, especially viewing angle characteristics, of the display device.

EXAMPLE 18

On the same polycarbonate retardation film as used in Example 1, a stable colloid of partially hydrolyzed silicon tetrachloride was coated using a bar coater #9 and air dried. The same liquid crystal oligomer as used in Example 1 was dissolved in toluene so as to make the concentration 20%, followed by dissolution of Irgacure 907 (mfd. by Ciba-Geigy AG) as a photopolymerization initiator in an amount of 2% based on the weight of the liquid crystal oligomer. The resulting solution was coated on the above-mentioned substrate using a bar coater #9 and dried at room temperature to give a liquid crystal oligomer film of 2.5 μm thick. The resulting liquid crystal oligomer film was clouded in white.

A laminate film comprising the resulting aligned liquid crystal oligomer and a substrate was heat treated at 80° C. for 5 minutes, followed by irradiation with ultraviolet light at 2 $J/cm^2$ from a high-pressure mercury lamp.

The resulting laminate of aligned polymerized liquid crystal oligomer and substrate showed 380 nm due to the retardation film. When this laminated film was inclined using the optical axis of the retardation film as an inclination axis, the retardation hardly changed. The viewing angle was 60° or more, and greatly improved compared with the case of single use of the retardation film.

When this laminated film of aligned polymerized liquid crystal oligomer and substrate is placed between the upper polarizing plate and the liquid crystal cell of an STN type liquid crystal display device, black and white display is given and the film shows excellent viewing angle characteristics.

EXAMPLE 19

On the same polycarbonate retardation film as used in Example 1, a hard coat agent (Sumiflex XR-11, a trade name, mfd. by Sumitomo Chemical Co., Ltd.) was coated using a bar coater #9 to form a film of about 5 µm, followed by photo curing. The resulting film was plasma treated in an Ar gas. The same liquid crystal oligomer as used in Example 1 was dissolved in toluene so as to make the concentration 20%, followed by dissolution of irgacure 907 (mfd. by Ciba-Geigy AG) as a photopolymerization initiator in an amount of 2% based on the weight of the liquid crystal oligomer. The resulting solution was coated on the above-mentioned substrate using a bar coater #9 and dried at room temperature to give a liquid crystal oligomer film of 2.1 µm thick. The resulting liquid crystal oligomer film was clouded in white.

A laminated film comprising the resulting aligned liquid crystal oligomer and a substrate was heat treated at 80° C. for 5 minutes, followed by irradiation with ultraviolet light at 1 J/cm$^2$ from a high-pressure mercury lamp.

The resulting laminate of aligned polymerized liquid crystal oligomer and substrate showed 380 nm due to the retardation film. When this laminated film was inclined using the optical axis of the retardation film as an inclination axis, the retardation hardly changed. The viewing angle was 60° or more, and greatly improved compared with the case of single use of the retardation film.

When this laminated film of aligned polymerized liquid crystal oligomer and substrate is placed between the upper polarizing plate and the liquid crystal cell of an STN type liquid crystal display device, black and white display is given and the film shows excellent viewing angle characteristics.

EXAMPLE 20

On the same polycarbonate retardation film as used in Example 1, a hard coat agent of ultraviolet light curable acrylic series was coated using a bar coater #9, air dried, and cured by irradiating ultraviolet light at 3 J/cm$^2$. The same liquid crystal oligomer as used in Example 1 was dissolved in toluene so as to make the concentration 20%, followed by dissolution of Irgacure 907 (mfd. by Ciba-Geigy AG) as a photopolymerization initiator in an amount of 2% based on the weight of the liquid crystal oligomer. The resulting solution was coated on the above-mentioned substrate using a bar coater #8 and dried at room temperature to give a liquid crystal oligomer film of 3 µm thick. The resulting liquid crystal oligomer film was clouded in white.

The resulting composite retardation film was heat treated at 80° C. for 5 minutes, followed by irradiation with ultraviolet light at 1 J/cm$^2$ from a high-pressure mercury lamp.

The resulting composite retardation film showed 380 nm due to the retardation film. When this composite retardation film was inclined using the optical axis of the retardation film as an inclination axis, the retardation hardly changed. The viewing angle was 60° or more, and greatly improved compared with the case of single use of the retardation film.

When this composite retardation film is placed between the upper polarizing plate and the liquid crystal cell of an STN type liquid crystal display device, black and white display is given and the composite film shows excellent viewing angle characteristics.

EXAMPLE 21

A cellulose triacetate film of 80 µm thick (Fijitax SH-80, a trade name, mfd. by Fuji Photo Film Co., Ltd.) was subjected to saponification treatment on the surface to give an optically transparent and isotropic polymer substrate. On this substrate, a 30% toluene solution of polymerizable liquid crystal oligomer obtained in Example 1 was coated by a gravure coating method so as to form a film of 2.8 µm thick after dried. After heat treating at 80° C. for 2 minutes for homeotropic alignment, ultraviolet light of 500 mJ/cm$^2$ as an integrated light amount was irradiated to give a polymerized liquid crystal oligomer/polymer laminated film having an isotropic in-plane refractive index, which is smaller than the refractive index in the thickness direction.

Further, as a uniaxially oriented retardation film, a uniaxially oriented retardation film having an in-plane retardation of 428 nm (Sumicalight SEF-360428, a trade name, mfd. by Sumitomo Chemical Co., Ltd.) was used.

Two retardation films were obtained by laminating the polymerized liquid crystal oligomer/polymer laminated film and the uniaxially oriented retardation film using an adhesive (construction: cellulose triacetate film/polymerized liquid crystal layer/polycarbonate uniaxially oriented film).

The resulting retardation films were placed between the liquid crystal cell and upper and lower polarizing films, respectively, in a FTN type liquid crystal display (FTN type LCD), mounted in a word processor (OASYS 30LX-401, a trade name, mfd. by Fujitsu, Ltd.) so as to face the polycarbonate uniaxially oriented film to the liquid crystal cell.

The FFN type LCD was small in change of contrast by means of the viewing angle, and particularly symmetrical, and showed wide viewing angle characteristics in the directions of azimuth angles of 60°, 120°, 240° and 300°.

Figure 5:
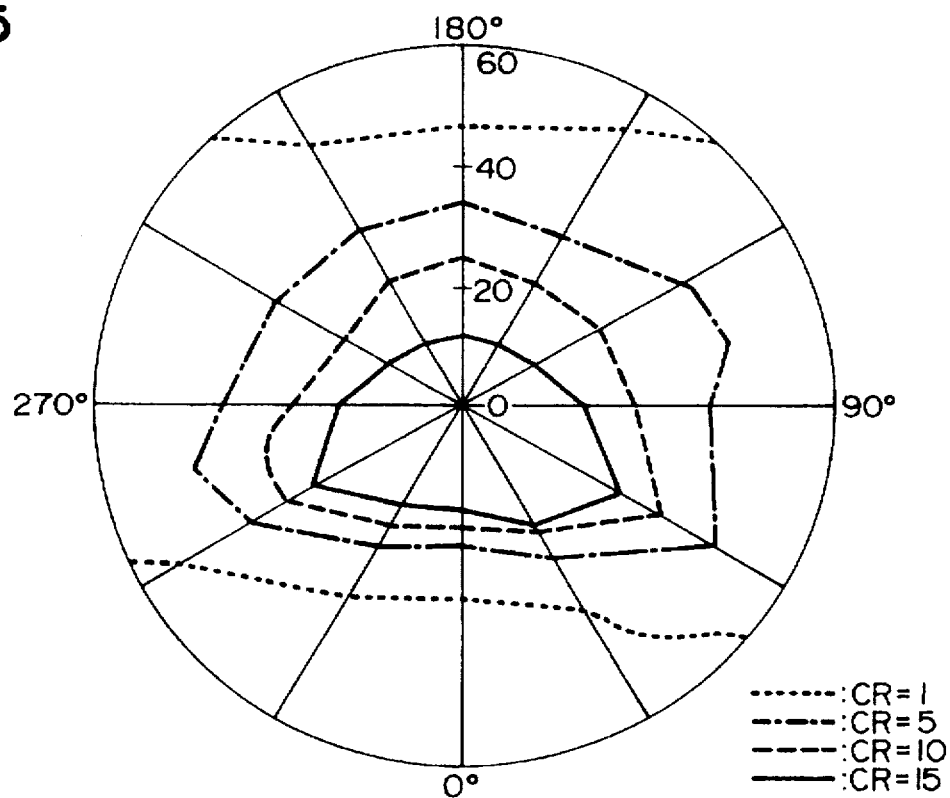
FIG. 5 is a drawing showing iso-contrast curves in Example 21.

Iso-contrast curves are shown in FIG. 5.

The iso-contrast curves were obtained by measurement using a device LCD-7000 (a trade name, mfd. by Otsuka Denshi Co.) by a transmitting method.

The voltage applied to the liquid crystal display device was controlled so as to obtain the best contrast when viewed by the naked eye from the front of the liquid crystal display device under practically driving state. Further, the retardation of the uniaxially oriented retardation film in this Example was obtained from the maximum wavelength of interference spectra using a spectrometer (MCPD-1000, a trade name, mfd. by Otsuka Denshi Co., Ltd.) wherein two polarizing prisms were placed in parallel in the optical system.

EXAMPLE 22

Figure 6:
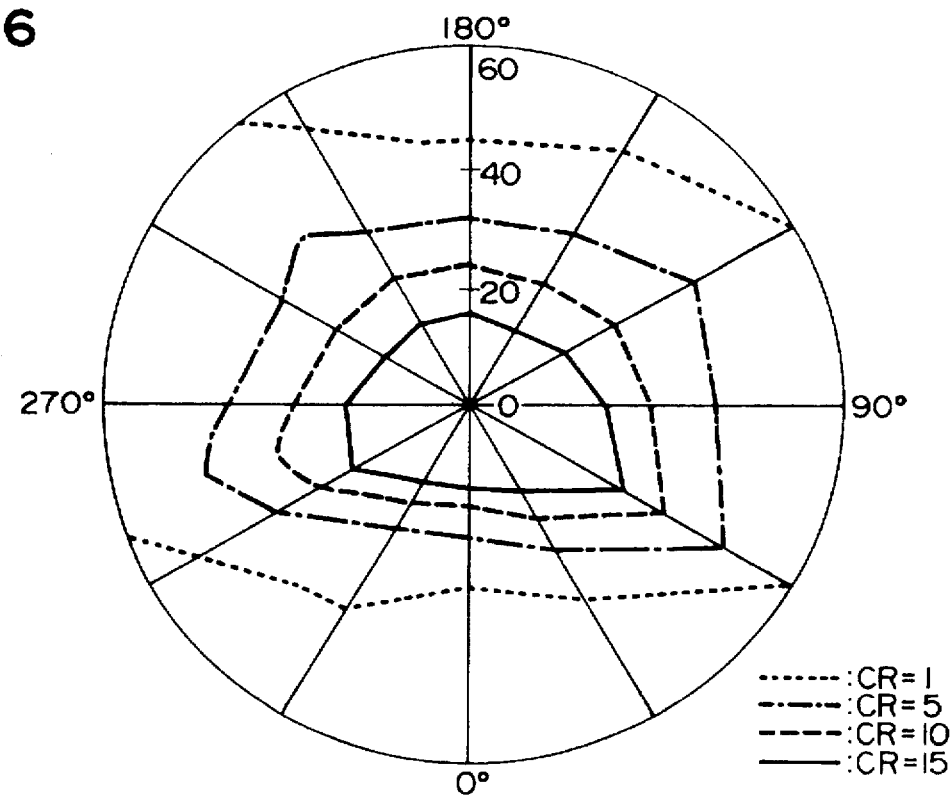
FIG. 6 is a drawing showing iso-contrast curves in Example 22.

A FTN type LCD was produced in the same manner as described in Example 9 except that the film thickness of the polymerized liquid crystal layer of polymerized liquid crystal oligomer/polymer laminated film was made 3.3 µm. The FTN type LCD was small in change of contrast by means of viewing angle and showed good viewing angle characteristics. The iso-contrast curves are shown in FIG. 6.

What is claimed is:

1. An optically anisotropic film comprising a polymer of a liquid crystal oligomer having positive refractive index anisotropy and showing nematic or smectic phase, said liquid crystal oligomer being selected from linear-chain or cyclic liquid crystal oligomers having the following recurring units (I) and (II):

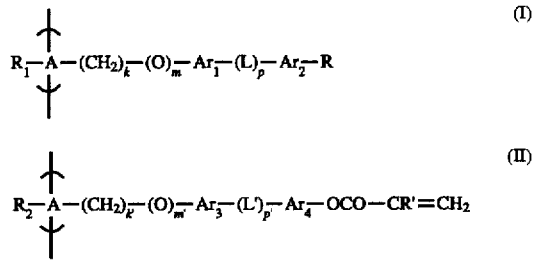

wherein A is a group represented by the following formula (III) or (IV):

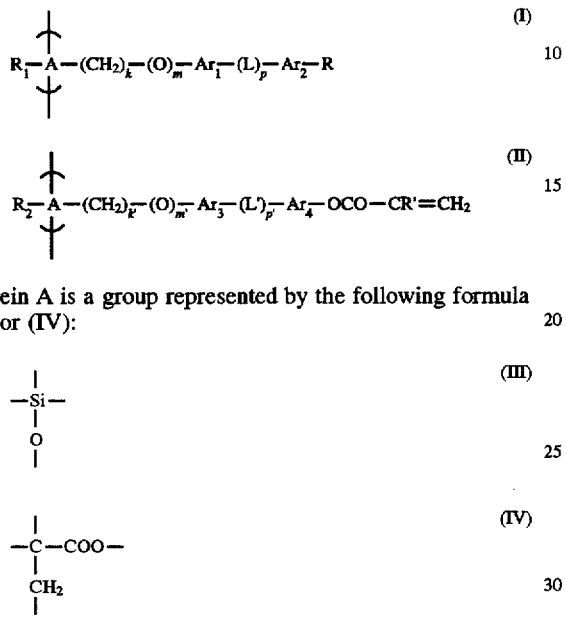

wherein, in the formula (III), —Si—O— is a main chain of the recurring unit (I) or (II) and, in the formula (IV), —C—CH$_2$— is linked to R$_1$— and —(CH$_2$)$_k$— and is a main chain of the recurring unit (I) or to R$_2$— and —(CH$_2$)$_k$— and is a main chain of the recurring unit (II) and COO group is positioned as a side chain; when A in the formula (I) is the formula (III) and when A in the formula (II) is the formula (III), R$_1$ and R$_2$ are independently hydrogen, a C$_{1-6}$ alkyl group or a phenyl group, and when A in the formula (I) is the formula (IV) and when A in the formula (II) is the formula (IV), R$_1$ and R$_2$ are independently hydrogen or a C$_{1-6}$ alkyl group; k and k' are independently an integer of 2 to 10; m and m' are independently 0 or 1; Ar$_1$, A$_2$, Ar$_3$ and Ar$_4$ are independently a 1,4-phenylene group, a 1,4-cyclohexylene group, a pyridine-2,5-diyl group or a pyrimidine-2,5-diyl group; L and L' are independently CH$_2$—O—, —O—CH$_2$—, —COO—, —OCO—, —CH$_2$—CH$_2$—, —CH=N—, —N=CH— or a divalent group represented by the formula:

p and p' are independently 0 or 1; R is halogen, a cyano group, a C$_{1-10}$ alkyl group or a C$_{1-10}$ alkoxy group; and R' is hydrogen or a C$_{1-5}$ alkyl group, wherein when the numbers of the recurring units (I) and (II) in one molecule of said oligomer are supposed to be n and n', respectively, n and n' are each an integer of 1 to 20 and satisfy the relation of 4≦n+n'≦21, and further characterized in that the terminal group of the recurring unit (II) is polymerized, and that the optical axis of said film is aligned substantially parallel to the normal line of the film; and said low-molecular weight compound being at least one compound selected from the group consisting of the compounds of the formulae (VI), (VII) and (VIII):

$$R_3-Ar_1-(L)_p-Ar_2-R_4 \quad (VI)$$

wherein $Ar_1$ and $Ar_2$ are independently a 1,4-phenylene group, a 1,4-cyclohexylene group, a pyridine-2,5-diyl group or a pyrimidine-2,5-diyl group; $R_4$ is halogen, a cyano group, a methacryloyl group, an acryloyl group, a $C_{1-20}$ alkyl group or a $C_{1-20}$ alkoxy group; L is —$CH_2$—O—, —O—$CH_2$—, —COO—, —OCO—, —$CH_2$—$CH_2$—, —CH=N—, —N=CH—, a 1,4-phenylene group or a divalent group represented by the formula (V); p is 0 or 1; and $R_3$ is $C_{3-30}$ alkyl group or $C_{3-30}$ alkoxy group;

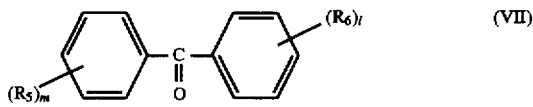

wherein $R_5$ and $R_6$ are independently hydrogen, $C_{1-20}$ alkyl group or $C_{1-20}$ alkoxy group; and m and l are independently 0 or 1;

$$CH_2=C(R_7)-COOR_8 \quad (VIII)$$

wherein $R_7$ is hydrogen or methyl group; and $R_8$ is $C_{1-30}$ hydrocarbon group;
the composition of said film being 100 parts by weight of said liquid crystal oligomer and 0.1–40 parts by weight of said low-molecular weight compound.

3. A process for producing an optically anisotropic film set forth in claim 1, which comprises forming a film of a linear-chain or cyclic liquid crystal oligomer composed of the recurring units (I) and (II), heat-treating said film so that the optical axis of the film is aligned substantially parallel to the normal line of the film, and then polymerizing the terminal group of the recurring unit (II).

4. A laminate of an optically anisotropic film and a hydrophilic substrate, which comprises an optically anisotropic film set forth in claim 1 and a transparent or semi-transparent substrate which is hydrophilic at the surface.

5. A lamine of an optically anisotropic film and a hydrophilic substrate according to claim 4, wherein the substrate is a glass plate, a hydrophilic polymer film, or a laminated film consisting of a hydrophilic polymer and a transparent or semitransparent polymer film.

6. A laminate of an optically anisotropic film and a substrate according to claim 4, wherein the substrate is a retardation film having the optical axis in the film plane, also having positive anisotropy of refractive index and made of a thermoplastic polymer, and the refractive index of the laminate is defined by the following formula:

$$n_x > n_z > n_y \quad (1)$$

wherein $n_x$ and $n_y$ are the maximum value and the minimum value, respectively, of the in-plane refractive index of the laminate, and $n_z$ is refractive index in the thickness direction of the laminate.

7. A composite retardation plate comprising, as laminations, a uniaxially oriented retardation film having the optical axis in the film plane, also having positive refractive index anisotropy and made of a thermoplastic polymer, and a laminate set forth in claim 4, characterized in that the refractive inces of said composite retardation plate is defined by the following formula:

$$n_x > n_z > n_y \quad (1)$$

wherein $n_x$ and $n_y$ are the maximum value and the minimum value, respectively, of the in-plane refractive index of the composite retardation film, and $n_z$ is the refractive index in the thickness direction of said film.

8. A composite retardation film having a polarizing film bonded thereto, characterized in that a polarizing film and a laminate set forth in claim 1 or an optically anisotropic film set forth in claim 4 and a hydrophilic substrate, or a composite retardation plate set forth in claim 7, are bonded to each other with a binder or adhesive.

9. A liquid crystal display device characterized in that at least one of an optically anisotropic film set forth in claim 1, a laminate of an optically anisotropic film and a substrate set forth in claim 4, and a composite retardation plate set forth in claim 7, is provided between a liquid crystal cell and a polarizing film disposed outside thereof, said liquid crystal cell comprising a liquid crystal layer held by the substrates having the electrodes, said layer also having positive dielectric anisotropy and oriented substantially homogeneously, with the helical axis torsionally aligned vertically to the substrate, when no voltage is applied, or a composite retardation film set forth in claim 8 having a polarizing film bonded thereto is disposed on said liquid crystal cell.

10. A liquid crystal display device characterized in that at least one of an optically anisotropic film set forth in claim 1 and a laminate set forth in claim 4 is provided between a homogeneously aligned liquid crystal cell and a polarizing film disposed outside thereof, said homogeneously aligned liquid crystal cell being held by the substrates having electrodes, said cell also having positive dielectric anisotropy and having the major molecular axis aligned substantially parallel to the substrate when no voltage is applied.

11. A liquid crystal display device characterized in that at least one of an optically anisotropic film set forth in calim 1, a laminate of an optically anisotropic film and a substrate set forth in claim 4, and a composite retardation plate set forth in claim 7, is provided between a liquid crystal cell and a polarizing film disposed outside thereof, said liquid crystal cell comprising a liquid crystal layer held by the substrates having the electrodes, said layer also having positive dielectric anisotropy and oriented substantially homogeneously, with the helical axis torsionally aligned vertically to the substrate, when no voltage is applied, or a composite retardation film set forth in claim 8 having a polarizing film bonded thereto is disposed on said liquid crystal cell.

12. A composite retardation film comprising a polarizing film bound to a uniaxially aligned retardation film having positive anisotropy of refractive index and made from a thermoplastic polymer via an adhesive, and at least one layer of the optically anisotropic film of claim 1 being present between the polarizing film and the retardation film, or one outerside or both outersides of the retardation film.

13. A composite retardation film according to claim 12, wherein the optically anisotropic film is formed on a transparent or semi-transparent substrate.

14. A composite retardation film according to claim 12, wherein the optically anisotropic film is formed on a uniaxially aligned retardation film having positive anisotropy of refractive index and made from a thermoplastic polymer.

15. A liquid crystal display device comprising
a pair of transparent substrates having electrodes thereon and sandwitching a liquid crystal cell containing a nematic liquid crystal layer having positive dielectric anisotropy and oriented substantially horizontally with a helical axis aligned vertically to the substrate when no voltage is applied,
a pair of polarizing films positioned outside a pair of the transparent electrodes, and
at least one uniaxially aligned retardation film having positive anisotropy of refractive index and made from a thermoplastic polymer positioned between the liquid crystal cell and at least one of the polarizing films, and at least one layer of optically anisotropic film set forth in claim 1 being present between the liquid crystal cell and at least one of the polarizing films.

16. A liquid crystal display device according to claim 15, wherein the optically anisotropic film is formed on a transparent or semitransparent substrate.

17. A liquid crystal display device according to claim 15, wherein the optically anisotropic film is formed on a uniaxially aligned retardation film having positive anisotropy of refractive index and is made from a thermoplastic polymer.

18. A liquid crystal display device comprising a pair of transparent substrates having electrodes thereon and sandwitching a liquid crystal cell containing a nematic liquid crystal layer having positive dielectric anisotropy and oriented substantially horizontally with a helical axis aligned vertically to the substrate when no voltage is applied, a pair of polarizing films positioned outside a pair of the transparent electrodes, and at least one uniaxially aligned retardation film having positive anisotropy of refractive index and made from a thermoplastic polymer positioned between the liquid crystal cell and at least one of the polarizing films, and at least one layer of optically anisotropic film set forth in claim 2 being present between the liquid crystal cell and at least one of the polarizing films.

19. A liquid crystal display device according to claim 18, wherein the optically anisotropic film is formed on a transparent or semitransparent substrate.

20. A liquid crystal display device according to claim 18, wherein the optically anisotropic film is formed on a uniaxially aligned retardation film having positive anisotropy of refractive index and made from a thermoplastic polymer.

21. A liquid crystal display device comprising a pair of transparent substrates having electrodes thereon and having disposed therebetween a liquid crystal cell containing a nematic liquid crystal layer having positive dielectric anistrophy and being homogeneously oriented in a substantially horizontal direction when no voltage is applied, and a pair of polarizing films positioned outside a pair of the transparent electrodes, and at least one layer of the optically anisotropic film set forth in claim 1 being present between at least one of the polarizing films and the liquid crystal cell.

22. A liquid crystal display device comprising a pair of transparent substrates having electrodes thereon and having disposed therebetween a liquid crystal cell containing a nematic liquid crystal layer having positive dielectric anisotropy and being homogeneously oriented in a substantially horizontal direction when no voltage is applied, and a pair of polarizing films positioned outside a pair of the transparent electrodes, and at least one layer of the optically anisotropic film set forth in claim 2 being present between at least one of the polarizing films and the liquid crystal cell.

23. A liquid crystal display device comprising a pair of transparent substrates having electrodes thereon and sandwitching a liquid crystal cell containing a nematic liquid crystal layer having positive dielectric anisotropy and oriented substantially horizontally with a helical axis aligned vertically to the substrate when no voltage is applied, a pair of polarizing films positioned outside a pair of the transparent electrodes, and at least one uniaxially aligned retardation film having positive anisotropy of refractive index and made from a thermoplastic polymer positioned between the liquid crystal cell and at least one of the polarizing films, and at least one layer of optically anisotropic film set forth in claim 1 being present between one of the retardation films adjacent to the retardation film and one of the polarizing films.

24. A liquid crystal display device according to claim 23, wherein the optically anisotropic film is formed on a transparent or semitransparent substrate.

25. A liquid crystal display device according to claim 23, wherein the optically anisotropic film is formed on a uniaxially aligned retardation film having positive anisotropy of refractive index and made from a thermoplastic polymer.

26. A laminate obtained by laminating an optically anisotropic film set forth in claim 1 on a transparent or semitransparent substrate subjected to hard coat treatment.

27. An optically anisotropic film according to claim 1, wherein said liquid crystal oligomer is selected from linear-chain or cyclic liquid crystal oligomers mainly composed of the recurring unit (II).

* * * * *